United States Patent [19]

Shapiro

[11] Patent Number: 5,321,776
[45] Date of Patent: Jun. 14, 1994

[54] DATA COMPRESSION SYSTEM INCLUDING SUCCESSIVE APPROXIMATION QUANTIZER

[75] Inventor: Jerome M. Shapiro, Philadelphia, Pa.
[73] Assignee: General Electric Company, Princeton, N.J.
[21] Appl. No.: 842,042
[22] Filed: Feb. 26, 1992
[51] Int. Cl.$^5$ .................... G06K 9/36; G06K 9/68; H04N 7/12
[52] U.S. Cl. ................................. 382/56; 382/37; 358/426; 358/432; 348/384
[58] Field of Search ........................ 382/56, 49, 37; 358/133, 12, 426, 429, 430, 432, 433; 364/725, 826

[56] References Cited

U.S. PATENT DOCUMENTS

| | | | |
|---|---|---|---|
| 4,447,886 | 5/1984 | Meeker | 358/133 |
| 4,751,742 | 6/1988 | Meeker | 358/133 |
| 4,816,914 | 3/1989 | Ericsson | 358/133 |
| 4,944,023 | 7/1990 | Imao et al. | 382/56 |
| 5,021,891 | 6/1991 | Lee | 358/433 |
| 5,048,111 | 9/1991 | Jones et al. | 358/426 |

OTHER PUBLICATIONS

Visual Communications and Image Processing '90, Oct. 1990, Lausanne, Switz., pp. 1822-1933. L. Salgado et al., "Pyramidal Encoding for Packet Video Transmission" para. 5.1-para. 5.2.
Visual Communications and Image Processing IV (SPIE vol. 11199) 1989, pp. 10-15-1026. L. Wang and M. Goldberg, "Block Transform Image Coding by Multistage Vector Quantization with Optimal Bit Allocation", p. 1016, line 27-p. 1017, line 17.
Optical Engineering, vol. 26, No. 7, Jul. 1987, pp. 581-589. K. H. Tzou, "Progressive Image Transmission: A Review and Comparison of Techniques", para. 4.
IEEE Journal on Selected Areas on Communications, vol. SAC-2, No. 2, Mar. 1984, pp. 359-373. A. Sanz et al.. "Approximation Quality Improvement Techniques in Progressive Image Transmission", p. 364, col. 1, line 17-p. 367, col. 2, line 10.
Visual Communications and Image Processing 90, Oct. 1990, Lausanne, Switz., pp. 924-935. S. H. Park and S. U. Lee, "The Coding Gains of Pyramid Structures in Progressive Image Transmission".
Lewis et al., "A 64 Kb/s Video Codec Using the 2-D Wavelet Transform", Proceedings of the DCC '90 Data Compression Conference, Apr. 8-11, 1991, IEEE Computer Society Press, Los Alamitos, CA, pp. 196-201.
Pentland et al., "A Practical Approach to Fractal-Based Image Compression", Proceedings of the DCC '91 Data Compression Conference, Apr. 8-11, 1991, IEEE Computer Society Press, Los Alamitos, CA., pp. 176-185.
Zettler et al., "Applications of Compactly Supported Wavelets to Image Compression", Proceedings of SPIE—The International Society for Optical Engineering, vol. 21, Feb. 13-15, 1990.
Ang et al., "Video Compression Makes Big Gains", IEEE Spectrum, Oct. 1991, pp. 16-19.
Burt et al., "The Lapacian Pyramid as a Compact Image Code", IEEE Transactions on Communications, vol. Com-31, No. 4, Apr. 1983, pp. 532-540.

Primary Examiner—Joseph Mancuso
Assistant Examiner—David Fox
Attorney, Agent, or Firm—Joseph S. Tripoli; Eric P. Herrmann; Ronald H. Kurdy

[57] ABSTRACT

A data processing system augments compression of non-zero values of significant coefficients by coding entries of a significance map independently of coding the values of significant non-zero coefficients. A dedicated symbol represents a zerotree structure encompassing a related association of insignificant coefficients within the tree structure. The zerotree symbol represents that a coefficient is a root of a zerotree if, at a threshold T, the coefficient and all of its descendants that have been found to be insignificant at larger thresholds have magnitudes less than threshold T. The zerotree structure is disclosed in the context of a pyramid-type image subband processor together with successive refinement quantization and entropy coding to facilitate data compression.

8 Claims, 16 Drawing Sheets

DATA COMPRESSION SYSTEM INCLUDING SUCCESSIVE APPROXIMATION QUANTIZER

FIELD OF THE INVENTION

This invention concerns a system for compression coding information to be conveyed via a digital signal transmission channel. In particular, this invention concerns a digital signal processing system for coding a data significance map.

BACKGROUND OF THE INVENTION

Among the primary objectives of a digital data compression system are the removal of redundant information and the accurate representation of remaining information using a minimum number of bits, before the data is conveyed via a transmission channel or storage medium. Data to be compressed may represent various types of information, such as audio and video information for example.

Coding of data for compression often requires that two factors be considered in particular, namely, the location of significant data and the value of significant non-zero data. Compression coding of data locations, which may be represented by the entries of a so-called significance map, advantageously augments the coding of the significant non-zero data.

Recent developments in the field of image signal processing, among others, continue to focus attention on a need for efficient and accurate forms of data compression coding. In this regard various forms of so-called "pyramid" signal processing have been proposed, particularly in the context of image information processing. Multiresolution "pyramid" processing of image data is described, for example, by Burr et al. in "The Laplacian Pyramid as a Compact Image Code", IEEE Transactions on Communications, Vol. Com-31, No. 4, April 1983. A so-called "wavelet" pyramid is a specific type of multiresolution pyramid that uses quadrature mirror filters (QMF) to produce subband decompositions of an original image representative video signal. A signal processor of this type is described by Pentland et al. in "A Practical Approach to Fractal-Based Image Compression", Proceedings of the DCC '91 Data Compression Conference, Apr. 8–11, 1991, IEEE Computer Society Press, Los Alamitos, Calif. The Pentland et al. compression system attempts to use low frequency coarse scale information to predict significant information at high frequency finer scales. QMF subband pyramid processing also is described in the book "Subband Image Coding", J.W. Woods, ed., Kluwer Academic Publishers, 1991.

Another system for pyramid processing image data is described by Lewis et al. in "A 64 Kb/s Video Codec Using the 2-D Wavelet Transform", Proceedings of the DCC '91 Data Compression Conference as mentioned above. Lewis et al. describe a coding system based on a model of human visual perception. Decomposed high pass bands are coded by constructing spatially local trees having nodes comprising 2×2 blocks of subtrees. The energy (a statistical measure) of a tree is compared with a human visual system weighted threshold to determine if a tree is important or not. If not, the coder assumes that the remainder of the tree if zero and a "zero flag" is sent.

A data compression system disclosed by J.M. Shapiro in a copending U.S. patent application Ser. No. 790,860 uses the absence of significant low frequency coarse scale information to predict the absence of significant information at higher frequency finer scales, in contrast to the Pentland et al. system which conversely attempts to predict significant information. In addition, the Shapiro system advantageously does not rely upon a statistical measure, such as energy, associated with a block of plural coefficients as in Lewis et al., since such reliance may lead to a significant coefficient being obscured by surrounding insignificant coefficients. Also unlike Lewis et al., the Shapiro system guarantees that for a given threshold neither a root element of a tree structure nor any descendant of a root element has a magnitude greater than the threshold.

It is herein recognized that a variant of the Shapiro system, as disclosed herein, can result in improved coding performance, albeit at the expense of an increase in memory and computation In the zerotree structure of the previously mentioned Shapiro system, a large significant coefficient value occurring at an intermediate (leaf) node in the tree structure would prevent the node ancestors from being a zerotree root in future evaluations at progressively smaller thresholds, e.g., in association with a successive approximation quantizer. In the system disclosed herein, using a successive approximation quantizer, once a coefficient is found to be significant, it is no longer necessary to include it in significance maps at smaller thresholds. Thus in accordance with the principles of the present invention, a significant coefficient found at an intermediate (e.g., leaf) node does not prevent an ancestor (at a coarser level) from being a zerotree root on future evaluations at smaller thresholds.

SUMMARY OF THE INVENTION

In accordance with the principles of the present invention, a digital data processing system includes means for generating a tree structure of data representative coefficients, the tree structure having multiple paths, e.g., from coefficients generated at a level of coarse information to coefficients generated at a level of relatively finer information. The coefficients are evaluated to distinguish between significant and insignificant coefficients. Means are also included for generating a dedicated symbol representing a related association of insignificant coefficients within the tree structure, from a root coefficient of the tree structure to a set of end coefficients of the tree structure. The symbol represents that a coefficient is a root of a tree structure if, at a particular reference level, the coefficient and all of its descendants that have been found to be insignificant at larger reference levels have magnitudes less than the particular reference level.

In an illustrated preferred embodiment of a system according to the invention, an encoder decomposes original image information constituted by picture elements into a plurality of image representative subbands at each of plural decomposition levels. The subbands include low frequency and higher frequency subband components. The low frequency subband at each decomposition level except the last is decomposed into the subband components of a subsequent lower decomposition level. The decomposition process produces an amplitude representative coefficient for each sample of an image decomposition. A coefficient at a given level can be related to a set of coefficients at a finer detail level, e.g., corresponding to twice the image resolution in some dimension. A coefficient at a relatively coarse level is designated a "parent", and coefficients at the same spatial or temporal location at the next finer detail level are designated as "children". For a given parent coefficient, all coefficients at all finer detail levels at the same location are referred to as "descendants". Similarly, for a given child coefficient, all coefficients at all coarser information levels at the same location are referred to as "ancestors". Coefficients are determined to be either significant or insignificant in magnitude with respect to each of plural sequentially determined thresholds. A coefficient is considered to be insignificant and a "root of a zerotree", whereby all descendants are predictably insignificant, if, at a particular threshold, the coefficient and all of its descendants that have been found to be insignificant at larger thresholds have magnitudes less than the particular threshold. A coefficient found to be a zerotree root is coded with a dedicated symbol which is eventually processed by an entropy coder. A substantial improvement in coding of insignificant coefficients may be achieved particularly for signals containing significant subband coefficients at medium and high frequencies, e.g., representing texture in images.

DETAILED DESCRIPTION

Figure 1:
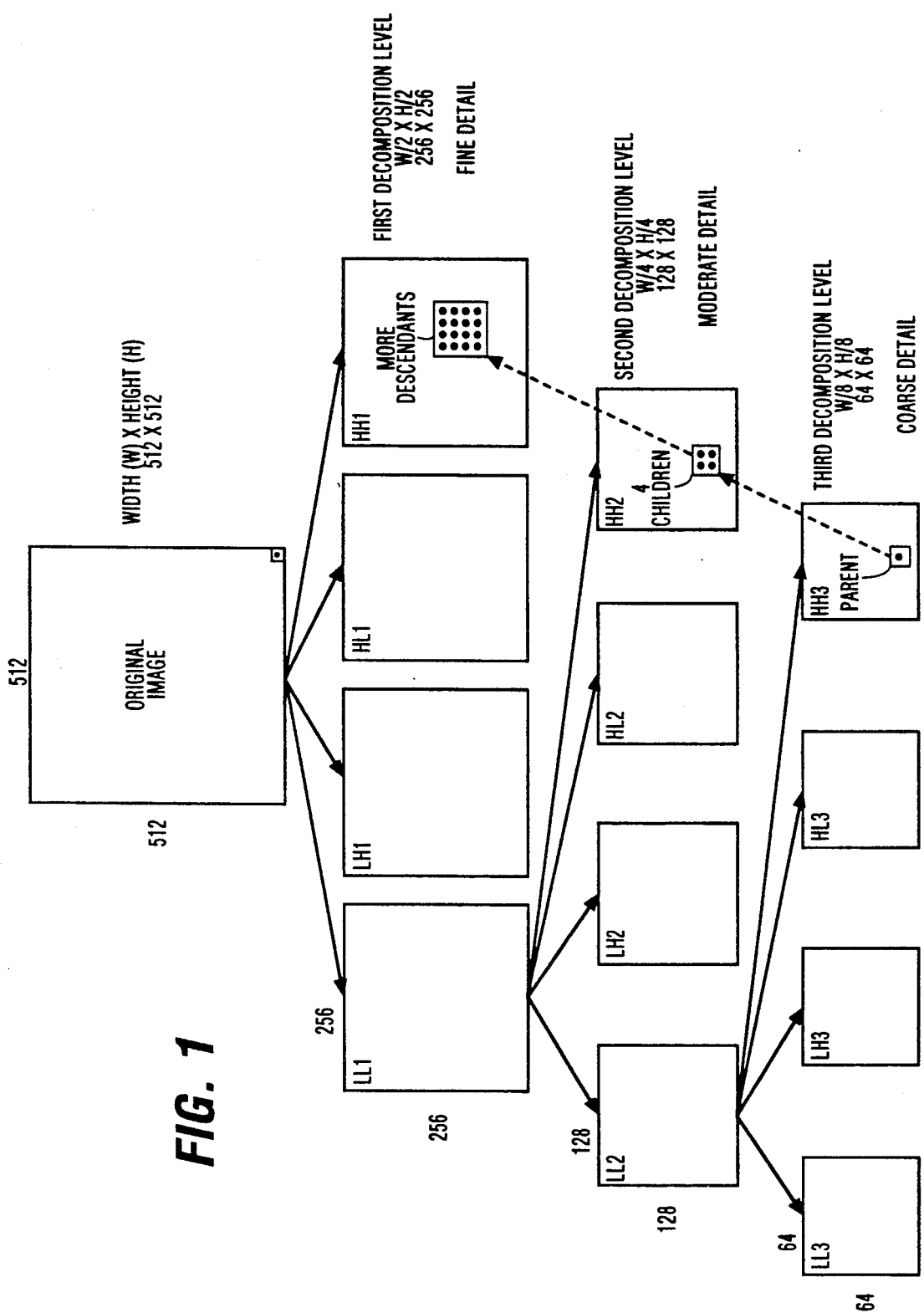
FIG. 1 depicts a multi-level image subband decomposition associated with the operation of a compression system according to the principles of the present invention.

In FIG. 1 an original image is decomposed into three pyramid levels. The original image map exhibits an aspect ratio defined by its width (W)×height (H) and is composed of a plurality of digital picture elements commonly referred to a "pels" or "pixels" representing a continuous intensity characteristic. In this example the original image is a 512 pel×512 pel image, with a single pel being shown in the lower right corner of the image. The mean (average) value of the original image is removed before the original image is subjected to subband decomposition, and is encoded separately.

The original 512×512 image exhibits the finest detail, or resolution. At a first decomposition level the zero-mean original image is decomposed into four subbands by means of apparatus that will be discussed in connection with FIG. 2. Each subband represents a band of spatial frequencies. The first level subband images are designated LL1, LH1, HL1 and HH1 as will be explained. The process of decomposing the original image involves subsampling by two in both horizontal and vertical dimensions, so that each of the four subband images at the first level is a 256×256 pel image, one-half the size of the original image in each dimension, with an aspect ratio of W/2×H/2 (not drawn to scale). Each coefficient at this level corresponds to four pels (a 2×2 area) at the same spatial location in the original image.

Subband LL1 contains simultaneously low frequency horizontal and low frequency vertical information. Typically a large portion of the image energy is concentrated in this subband. Subband LH1 contains low frequency horizontal information and high frequency vertical information (i.e., vertical edge information). Subband HL1 contains high frequency horizontal information and low frequency vertical information (i.e., horizontal edge information). Subband HH1 contains high frequency horizontal information and high frequency vertical information (i.e., texture or diagonal edge information).

Each of the succeeding second and third lower decomposition levels is produced by decomposing the low frequency LL subband of the preceding level. Thus subband LL1 of the first level is decomposed to produce subbands LL2, LH2, HL2 and HH2 of the moderate detail second level. Similarly, subband LL2 is decomposed to produce coarse detail subbands LL3, LH3, HL3 and HH3 of the third level. Due to subsampling by two, each second level subband image is a 128×128 pel image that is one-quarter the size of the original image. Each sample (pel) at this level represents moderate detail since each, corresponds to the information defined by 16 pels (a 4×4 area) in the original image at the same location. Similarly, each third level subband image is a 64×64 pel image that is ⅛ the size of the original image. Each pel at this level corresponds to relatively coarse detail since each represents the information defined by 64 pels (an 8×8 area) in the original image at the same location. Since the decomposed images are physically smaller than the original image due to subsampling, the same 512×512 memory used to store the original image can be used to store all of the decomposed subband images. In other words, the original image and decomposed subbands LL1 and LL2 are discarded and are not stored. A parent-child relationship exists between a subband component representative of coarse detail relative a corresponding subband component at the next higher detail level. Although only three subband decomposition levels are shown, additional levels could be developed in accordance with the requirements of a particular system. Also, with other transformations such as DCT or linearly spaced subbands, different parent-child relationships may be defined as will be seen in connection with FIGS. 5-8.

Figure 2:
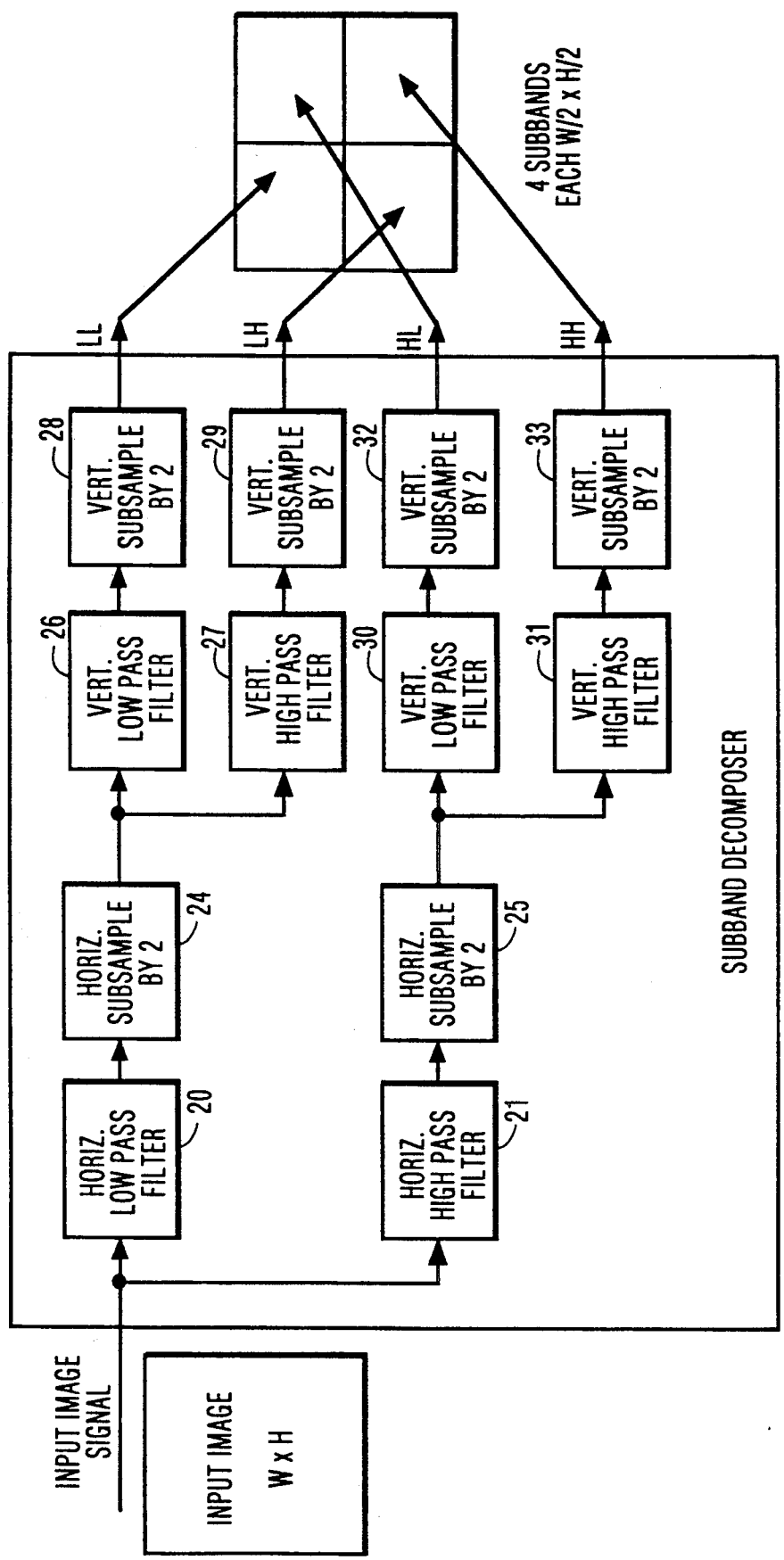
FIG. 2 illustrates apparatus for decomposing an image representative signal into a plurality of subband components.

The process of subband decomposition may be performed by the apparatus shown in FIG. 2. An input signal representing an image with dimensions W×H is horizontally low pass and high pass filtered by units 20 and 21 before being horizontally subsampled by two via units 24 and 25. A subsampled output signal from unit 24 is vertically low pass and high pass filtered by units 26 and 28 before being vertically subsampled by two via units 28 and 29, respectively. Subband components LL and LH appear at respective outputs of units 28 and 29. Similarly, the output signal from unit 25 is vertically low pass and high pass filtered by units 30 and 31 before being vertically subsampled by units 32 and 33, respectively. Subband components HL and HH appear at respective outputs of units 32 and 33. The filter units associated with the subband decomposer preferably are digital quadrature mirror filters (QMF) for splitting the horizontal and vertical frequency bands into low frequency and high frequency bands. QMF units at succeeding lower decomposition levels are similar to filter units at the preceding level.

Figure 3:
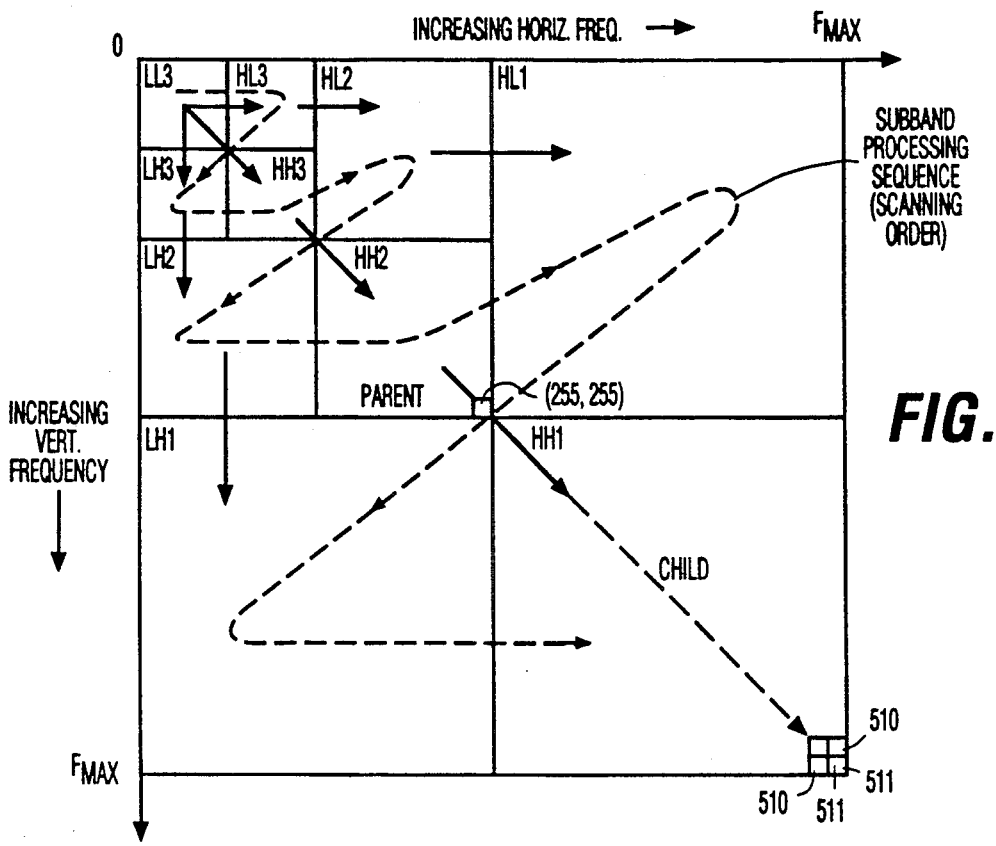
FIGS. 3-8 illustrate various forms of multi-level subband decompositions.

The relationships of the plural subbands at the three decomposition levels are depicted in another way in FIG. 3. The parent-child relationship between corresponding subbands at different decomposition levels is indicated by the solid arrows, which point from a parent element at a relatively coarse data level to a child element at a finer data level. FIG. 3 depicts tree dependencies for a wavelet pyramid where all parents have children in one subband, except for subband LL3. Subband LL3 being in the last decomposition level is the only LL subband that is not decomposed, and is a "parent" to subbands HL3, LH3 and HH3. The dotted line indicates one possible sequence for processing the plural decomposition levels, from the lowest frequency subband to the highest frequency subband in each level, beginning with the coarsest data level. Certain other aspects of FIG. 3 will be discussed in connection with FIG. 12.

Figure 4:
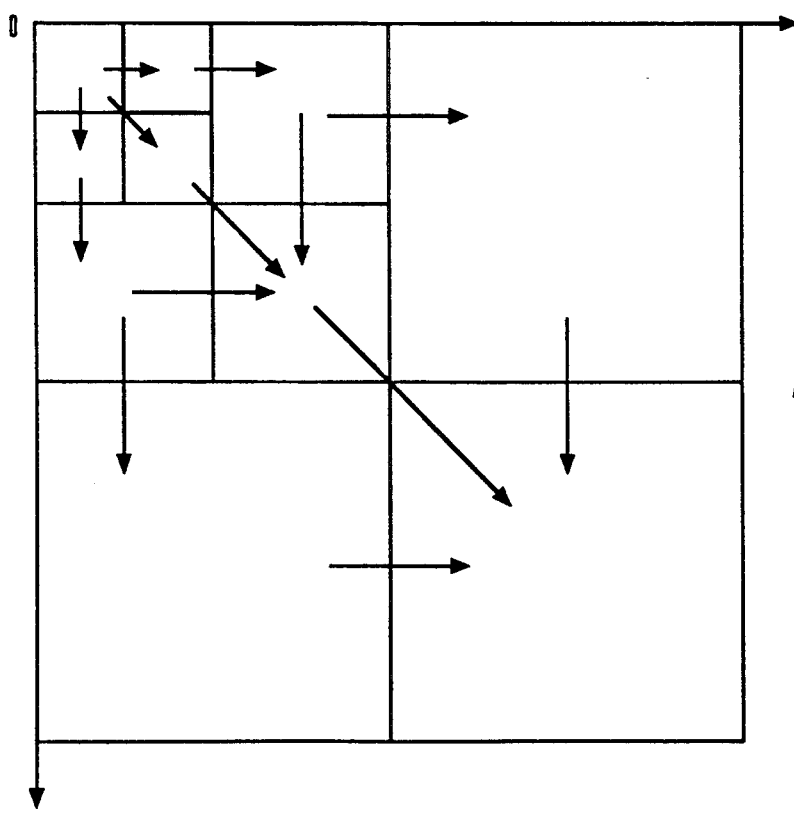
Figure 5:
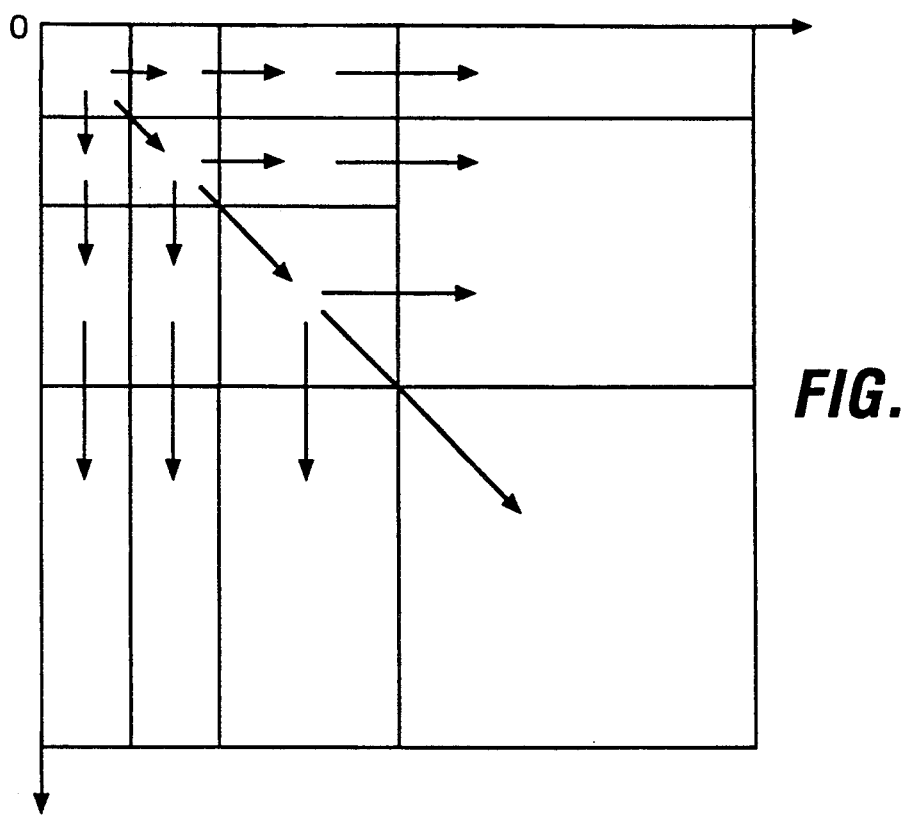
Figure 6:
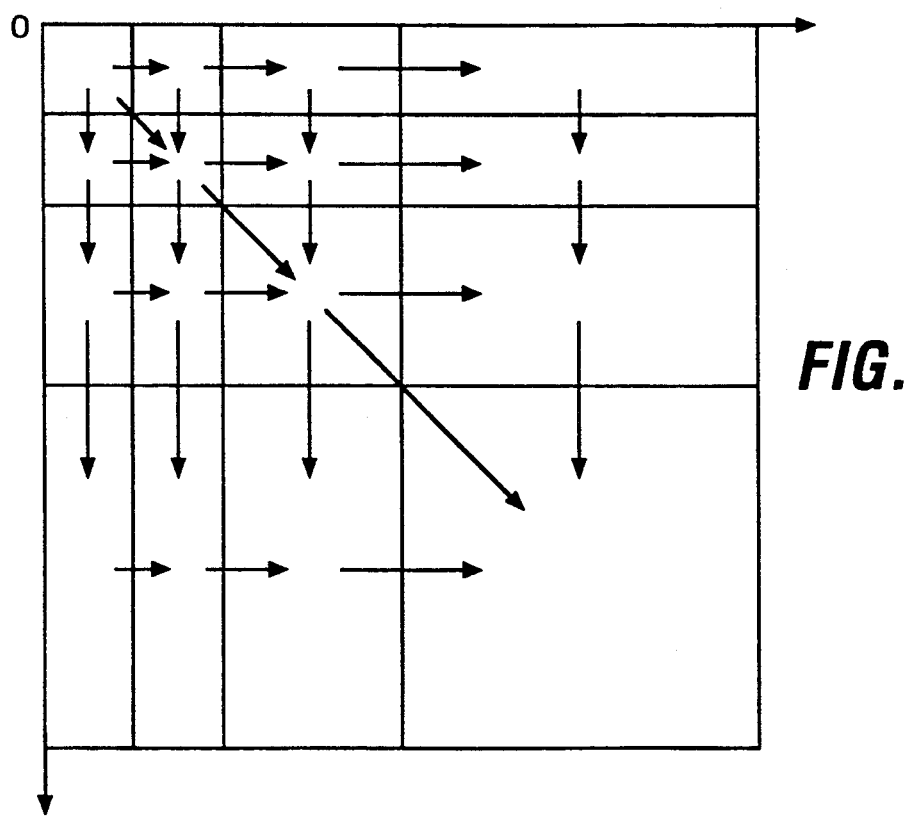
Figure 7:
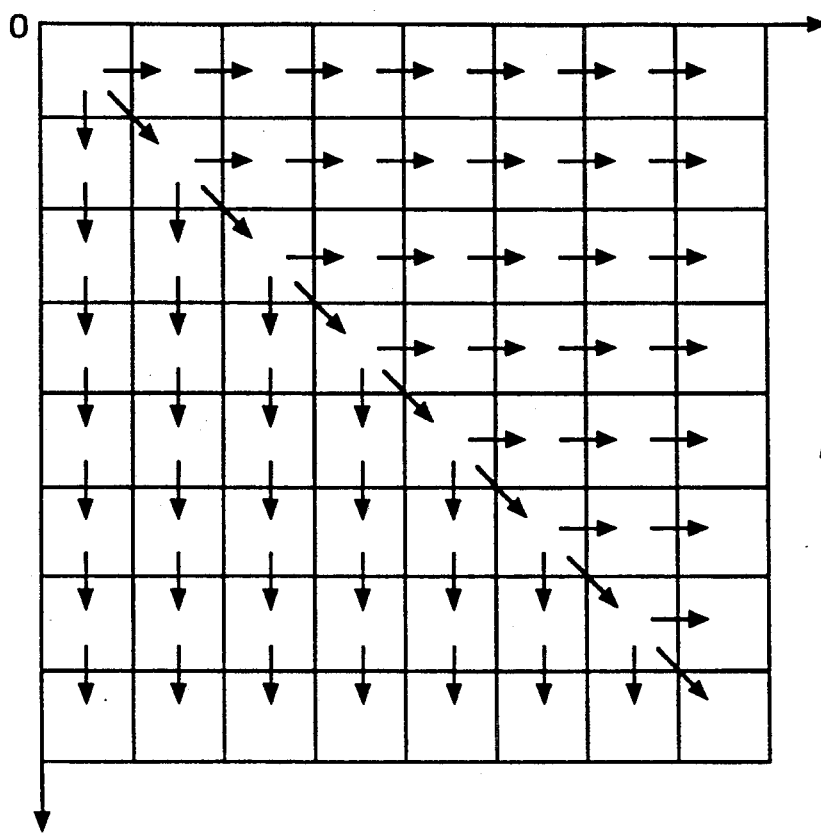
Figure 8:
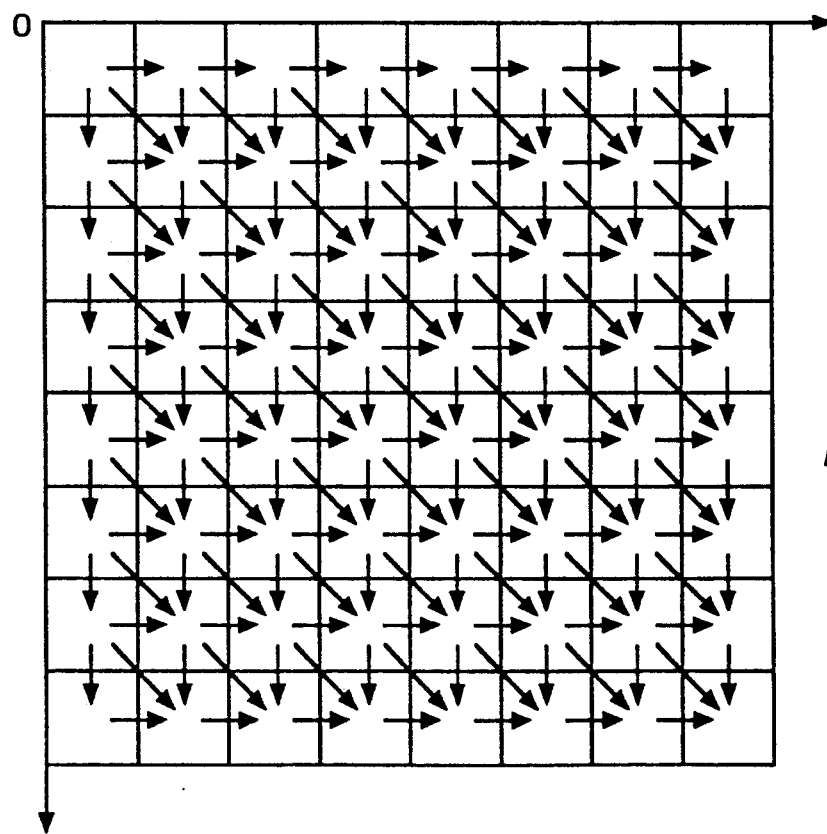

FIGS. 4–8 illustrate alternative subband decomposition formats. The subband format of FIG. 4 is similar to that of FIG. 3 except that each child element (e.g., coefficient) may have multiple parent elements. FIGS. 5 and 6 depict tree dependencies for separable wavelet decompositions for child elements having single and multiple parent elements, respectively. In a separable decomposition, horizontal filtering and subsampling operations may be completed before vertical filtering and subsampling operations, or vice-versa. FIGS. 7 and 8 depict tree dependencies for a separable block transform of a linearly spaced subband scheme such as the Discrete Cosine Transform (DCT), for child elements having single and multiple parent elements, respectively.

The coding system to be described achieves data compression of a significance map associated with a given subband decomposition for a given specified threshold. The coding system for the significance map augments compression of the actual non-zero values of significant coefficients such as by means of a disclosed successive approximation quantizer and entropy coder capable of producing a bitstream having bits arranged in order of importance.

The disclosed system addresses the matter, among others, of coding the significance map indicating whether a coefficient (in this case a coefficient of a 2-D discrete wavelet transform) has a zero or a non-zero quantized value. This is an important aspect of high compression, low bit rate image coding. In order to achieve very low bit rates, i.e., one bit per pel after quantization, the probability of a zero representative symbol occurring will be very high. Since much of the bit budget typically is spent on coding the significance map, a significant improvement in coding the significance map yields a significant improvement in low bit rate compression.

The cost of coding the significance map is reduced by means of the disclosed zerotree structure. Traditional techniques employing transform coding commonly code the significance map with a form of run-length coding, as in the proposed JPEG image processing standard. While such coding may exploit some of the non-independence of coefficients quantized to zero, it typically does not improve upon the first order entropy because the lengths of the runs must be encoded. End-of-block (EOB) codes have been used, e.g., in the JPEG system, to indicate that all remaining coefficients in a block are zero. A major advantage of the disclosed zerotree structure over EOB codes is that as the subband in which a zerotree root occurs increases in coarseness (decreases in frequency), the number of predicted coefficients increases exponentially. In contrast, as the frequency at which the EOB symbol occurs decreases in frequency, the number of predicted coefficients increases only linearly. Thus with the zerotree structure many more coefficients can be predicted particularly in smooth areas where a root typically occurs at a coarse scale.

A significance map associated with a given subband decomposition for a specified threshold is effectively a copy of the subband decomposition (FIG. 3) where each coefficient has been replaced by an entry value representing a binary decision. For example, a value "0" may be used to indicate that the magnitude of the associated coefficient is insignificant (having a magnitude less than or equal to the threshold), whereas a "1" value may be used to indicate that the magnitude of the associated coefficient is significant (having a magnitude greater than the threshold). The definition of a significance map can also be expanded to include a ternary map where significant entries are divided into positive and negative entries using the values "1" and "−1" to indicate the significance and the sign of the entries, while still using "0" to represent insignificance. By virtue of the subband coefficient associated with each entry of the significance map being either significant or insignificant, the significance map effectively indicates the locations of the significant coefficients of the subband decomposition. Encoding a significance map separately from the coefficient values is especially useful for low bit rate (e.g., less than one bit per sample) data compression systems, because in order to achieve such a low bit rate (high compression), the number of significant coefficients must be extremely small. Since coding a significance map involves either a binary decision (significant or insignificant) or a ternary decision (positive significant, negative significant or insignificant when the sign is also represented in the significant map), an encoding technique well suited to encoding many samples from a small alphabet, such as adaptive arithmetic coding or run-length coding, can be used to encode the significance map. To encode the magnitudes of the non-zero values, different techniques that are optimized for encoding samples from a large alphabet, such as Huffman coding with predetermined tables as used in a baseline JPEG system, can be used.

Zerotree coding efficiently codes the significance map associated with a given subband decomposition for a specified threshold. In addition to using symbols indicating the significance or insignificance of a single isolated coefficient in the associated subband decomposition, wherever possible, the entries of insignificant coefficients (those with magnitudes less than or equal to the given threshold) are grouped together and jointly coded by forming zerotree structures of multiresolution data representations in the illustrated system, and roots of zerotrees are coded with a single dedicated symbol in the significance map encoder's alphabet. To this end, each coefficient is evaluated individually. An entry in the significance map is coded as a zerotree root when its associated subband coefficient and all of its descendants have a magnitude less than or equal to the specified threshold. If, however, there is a significant descendant, the entry for an insignificant coefficient is encoded using the symbol for an "isolated zero". Thus, the significance map is encoded with three symbols (significant, isolated zero, zerotree root) for the case of a binary significance map, or four symbols (positive significant, negative significant, isolated zero, or zerotree root) for the case of a ternary significance map for signed data.

Zerotree coding is particularly useful in low bit-rate compression systems because the determination that an entry in the significance map is the root of a zerotree typically predicts the insignificance of a large number of descendant coefficients. Since the entries in the significance map associated with descendant coefficients can be predicted from the root, no additional symbols are needed to encode their insignificance. The insignificance of the entire tree therefore is encoded at a very low cost.

Although conventional means may be used to encode actual values of the significant non-zero coefficients, the thresholding operation associated with the zerotree structure advantageously allows its use with a successive approximation quantizer for refining data at progressively finer thresholds. To this end, a multistage quantizer uses zerotree encoding at progressively finer thresholds to efficiently encode the significance map associated with those coefficients that had been considered insignificant at the previous larger threshold.

For the successive approximation quantizer, subband images of each decomposition level are coded using a multi-stage coding system, whereby each sage uses a progressively finer threshold to determine significance. The coding system maintains two lists of coefficient coordinates in memory. Additionally, the coding system maintains two copies of the subband decomposition in memory. The first copy, referred to as the original copy, is maintained by the coding system unmodified. The second copy, referred to as the dominant copy, will be modified in such a way that whenever a coefficient is found to be significant, its value on the dominant copy is set to zero. At the beginning of a stage, a dominant list contains the coordinates of those coefficients that have not yet been found to be significant. A subordinate list contains the coordinates of those coefficients of the original copy that have been previously found to be significant with respect to previous, larger, thresholds. Each list contains the coordinates in the order in which the coefficients will be processed for coding. At the beginning of the very first stage, all coefficient coordinates are found in an original dominant list and the subordinate list is empty, since no coefficient has yet been established as being significant. As coefficients are determined to be significant or insignificant, their entries are moved from the original dominant list to either the subordinate list, or to a newly generated dominant list, respectively. The original dominant list disappears after the coefficients associated with all of its entries have been evaluated, and the new dominant list and the subordinate list are subsequently refined at progressively finer thresholds. At each finer threshold, new entries of coordinates of significant coefficients are appended to the end of the subordinate list, thereby causing the coordinates of significant coefficients found at one threshold to always precede the coordinates of significant coefficients found at finer thresholds. As a result, the portion of the bit stream corresponding to a refinement of the coefficients on the subordinate list contains bits arranged in order of importance, where refinement of coefficients occurs in the order determined by the subordinate list. Thus, coefficients found to be significant in the first stage, i.e., with a large magnitude, are always refined before coefficients first found to be significant in later stages, i.e., those with smaller magnitudes.

Figure 9:
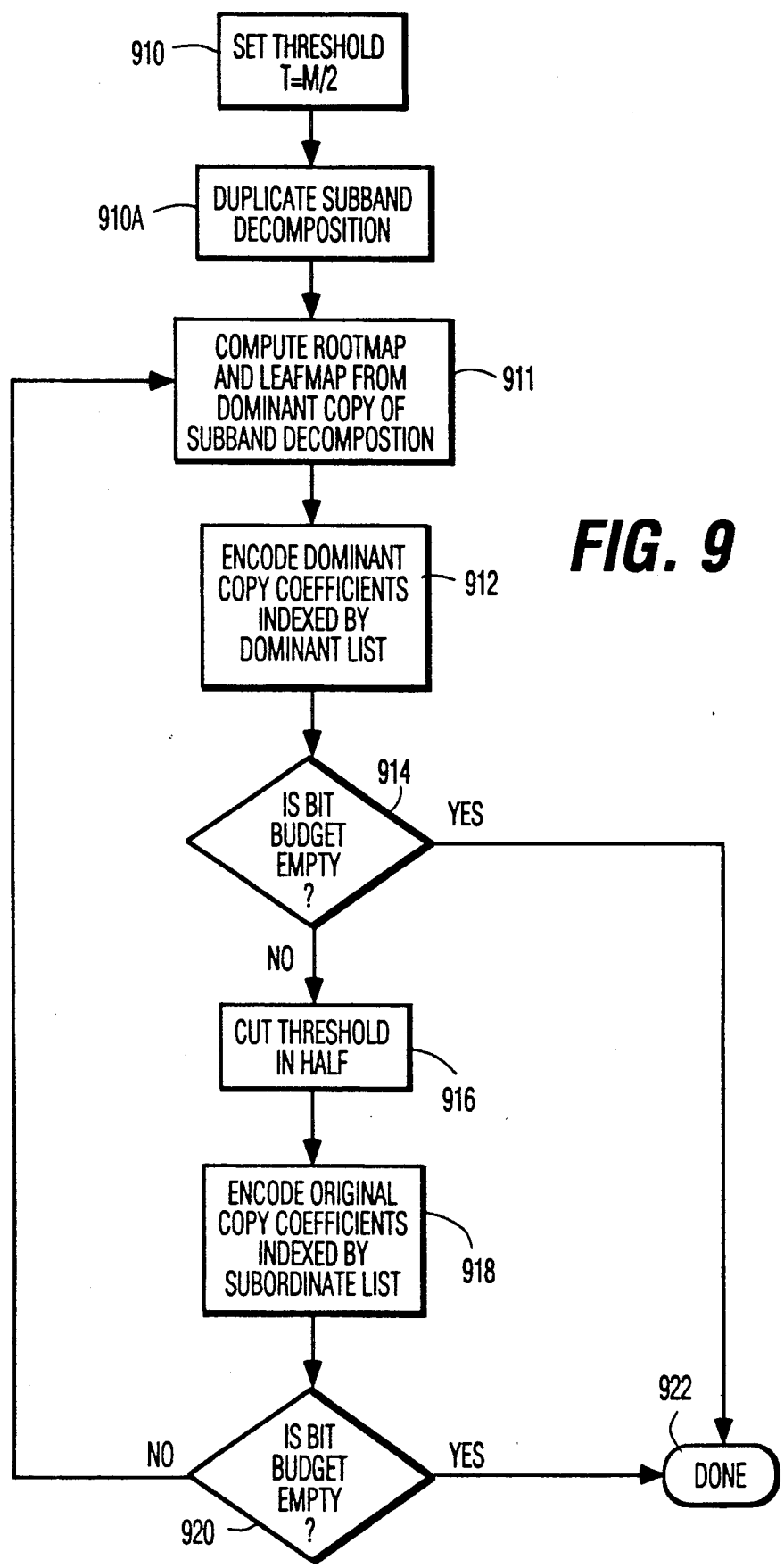
FIGS. 9, 10, 11, and 12 are flowcharts depicting various aspects of the operation of a coding system according to the present invention.

The general coding procedure for the subband decomposition is illustrated by the flowchart shown in FIG. 9. The coding procedure is shown in greater detail in FIGS. 10 and 11. Coding follows the subband processing sequence (scanning order) shown in FIG. 3. Thus in the beginning of the coding process the coefficients being coded represent primarily low frequency (coarse) information. In FIG. 9, unit 910 establishes an initial threshold level T equal to one half of the maximum single absolute value M of all coefficients from among all subband images at all decomposition levels. In unit 910A, a copy of the original subband decomposition is made and denoted as the dominant copy. In unit 911, two companion maps, a rootmap and a leafmap whose use will be discussed later, are computed from the dominant copy of the subband decomposition. These maps will be used by the encoder to quickly identify zerotrees. In unit 912 the coefficients associated with the original dominant list are processed at this threshold in the order in which the coordinates of each coefficient are found on the list. The list contains only the coordinates of each coefficient, not the value of the coefficients as developed by the subband decomposition process. The coefficient values are stored in a separate memory from which they are obtained as needed during the coding process.

In comparator 914 the number of coded bits produced by unit 912 is compared to the total number of bits available from a prescribed bit budget. The bit budget may be embodied by a counter that determines the number of bits available for coding at any given time, the counter being decremented by the number of output bits from an arithmetic entropy coder associated with unit 912. The bit budget may be a function of a variety of factors, such as the product of the desired bit rate (e.g., 0.25 bits/pel) and the number of coefficients to be coded (in this case 262,144 subband coefficients for a 512×512 image), the capacity of a modem by which the coded bitstream will be transmitted, or the capacity of a disk or tape used to store the coded bitstream. If the bit budget is empty at this point, coding is terminated as indicated by unit 922. Otherwise, coding continues via unit 916 which generates a new threshold equal to one-half the value of the prior threshold, and by refining coefficients from the subordinate list at the current new threshold in unit 918. The number of encoded bits is again compared to the bit budget in comparator 920, and coding ceases if the bit budget is empty. If not, the rootmap and leafmap are recomputed from the dominant copy of the subband decomposition, which may at this point have been modified from the original copy of the subband decomposition. Then, the dominant list coefficients are processed at the current threshold in unit 912, and coding continues as described above until the bit budget is empty. At each coding pass at a current (refined) threshold, coefficients previously found to be significant at a prior (coarser) threshold are deemed more important and thus are evaluated at the current threshold before coefficients previously found to be insignificant at prior thresholds. Coding may be restricted by factors other than the status of the bit budget, such as by a predetermined number of threshold iterations, a quality index related to an amount of acceptable distortion, root-mean-square criteria, or attainment of a desired bit rate such as ¼ bit/pel.

Coding is refined to progressively higher degrees of precision as the dominant and subordinate lists are evaluated at progressively smaller thresholds relative to the preceding threshold. In this example the threshold is progressively reduced by a factor of 2, although other factors may be selected depending on the requirements of a particular system. In the dominant pass three coefficient possibilities (positive significant, negative significant and insignificant) are coded using an alphabet of four symbols. The four symbols are "0" representing an insignificant isolated zero coefficient, "1" representing an insignificant zerotree root, "2" representing a positive significant coefficient, and "3" representing a negative significant coefficient. The "1" zerotree root symbol is the only "grouped" symbol and can occur only in the case of a coefficient with descendants. Although five coding possibilities exist, only the four listed coding symbols are used. The uncoded fifth possibility, an insignificant coefficient descending from a zerotree root, is implicitly coded when a "1" zerotree root symbol is encoded for the ancestor.

Figure 10:
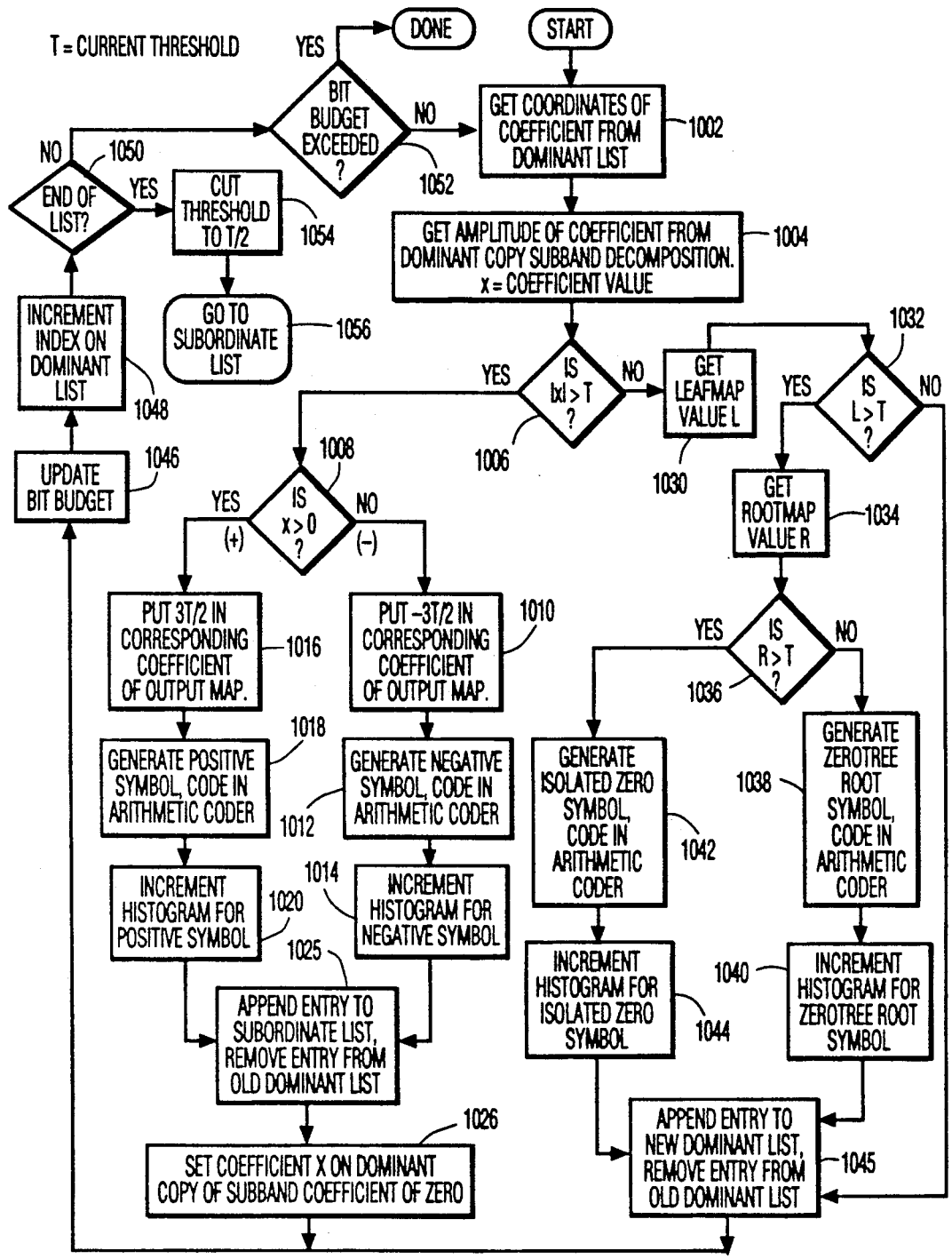

FIG. 10 is a flowchart illustrating the system for coding a subband image to develop the portion of the bitstream corresponding to the dominant list.

Coding starts by obtaining the index and associated x, y coordinates of the first coefficient from the original dominant list, as indicated by unit 1002. The list is an arrangement of the subband coefficient indices in the order the associated coefficients will be processed. Each index on the list (dominant and subordinate) specifies the position in the list of a given entry. Each entry designates the coordinates of an associated element of each of the two versions of the subband decomposition for which coefficients have been generated and placed in memory at prescribed addresses. The processing order is determined by the subband processing sequence shown in FIG. 3. More specifically, in this example the coordinates associated with coefficients in the HL subbands containing low frequency vertical information are arranged to produce vertical scanning of such coefficients, and the indices associated with coefficients in the LH subbands containing low frequency horizontal information are arranged to produce horizontal scanning of such coefficients. The indices associated with coefficients in the LL and HH subbands are arranged to produce scanning in accordance with a so-called Peano-Hilbert plane filling curve, as discussed in Lempel et al., "Compression of Two Dimensional Data", IEEE Transactions on Information Theory", Vol. IT-32, No. 1, January 1986.

On the original dominant list, the subbands are scanned one at a time such that a parent coefficient always appears before its child coefficient. A zerotree can begin with a coefficient in a given decomposition level and end at the first decomposition level, but cannot end at an intermediate decomposition level. Thus, where zerotrees are possible, scanning begins with coefficients in the lowest frequency subband, LL3, and ends with coefficients in the highest frequency subband, HH1.

In unit 1004 the amplitude of the coefficient at the current index entry is obtained from memory where the amplitude value was stored in the dominant copy of the subband decomposition. Comparator 1006 compares the absolute value of the coefficient amplitude (X) to the current threshold, which at this point is the initial threshold $T = M/2$ as discussed in connection with FIG. 9.

If the absolute value of X is greater than the current threshold, the current coefficient is considered significant and is next evaluated by comparator 1008 to determine its polarity. If the coefficient is negative, coding proceeds to block 1010 where a reconstruction value $-3/2\ T$ is entered in the corresponding coefficient location of an output map that is used in the coding process. The output map is a 512×512 image map having coefficient coordinates corresponding to those of the subband decomposition being coded, of the form shown in FIG. 3. The output map contains the encoder's version of the subband decomposition that the decoder could reconstruct from the information produced in the bit stream thus far. The output map developed at the encoder corresponds to an identical output map that is developed at the decoder, from which an output image can be reproduced. In order for the decoding process to track the encoding process, any encoding decision regarding relative importance of coefficients, or movement of entries between or within dominant or subordinate lists, must be based solely on information in the output map, i.e., on information that has previously been encoded. The output map is initialized with zero values for all coefficients, and is updated with the best decodable estimate of the current signed value of each significant coefficient as coding progresses. The process of refining the coefficients of the output map as coding continues is essentially a progressive reconstruction of the output map with increasingly refined coefficient values.

The output map always keeps the best estimate of the true value of the coefficient. While processing coefficients found on the dominant list, when a coefficient X is found to be significant, its reconstruction magnitude in the output map is placed halfway between the current threshold and twice the current threshold, with the correct sign. This has the effect of placing a reconstructed coefficient value in the center of a quantization bin (range), midway between adjacent decision levels, in an attempt to minimize the error of a decoded value. Thus, for positive X, a positive reconstruction offset equal to one-half the current threshold (½ T) is added to the current threshold by unit 1016 to produce a reconstruction value of $3/2\ T$ in the output map. By a similar process, unit 1010 produces a reconstruction value of $-3/2\ T$ in the output map for a negative value of X. This reconstruction offset technique aids the decoding process, which can be stopped at any time such as when the decoder data capacity has been reached, for example. If the decoding process is stopped, the output map contains the best reconstruction of the subband decomposition that can be achieved with the decoded information.

When comparator 1008 indicates a negative significant coefficient, a symbol "3" is generated and applied to an arithmetic entropy coder by means of unit 1012. Unit 1014 increments a histogram associated with the arithmetic entropy coder to indicate that a negative significant symbol "3" has been generated. Unit 1025 then removes the coordinate of the current coded coefficient from the original dominant list, and appends such coordinate to the subordinate list of coordinates of significant coefficients. Unit 1026 sets the coefficient in the dominant copy's memory to zero, so that in future dominant passes this coefficient will be deemed insignificant. The significance of this operation is explained below.

When a significant value is found at an intermediate or leaf node of a tree, its significance is known by the encoder and can be deduced by the decoder. To achieve maximum compression, such significant value should not prevent its ancestors from being part of zerotrees on later evaluations at smaller thresholds. This result requires additional memory and computation. Two copies of the subband decomposition must be made. The original copy is maintained unchanged, but the dominant copy has all values that were found to be significant at previous larger thresholds set to zero. Thus the dominant copy is used to encode significance maps of newly significant coefficients, i.e., coefficients not already known to be significant from previous evaluations. When a coefficient is found to be significant, it is removed from consideration at subsequent smaller thresholds by setting its value to zero as noted. This prevents such coefficient from nullifying trees that would otherwise be zerotrees. In addition to requiring an additional copy of the subband decomposition, the rootmap and leafmap must be recomputed before processing at each new threshold.

Analogous operations occur in the left branch path from comparator 1008 if X is found to have a positive value. In such case unit 1016 inserts a positive reconstruction value 3/2T in the output map, and unit 1018 generates a symbol "2" indicative of a positive significant coefficient and provides this symbol to the entropy coder. Unit 1020 increments the entropy coder histogram for the "2" symbol, and units 1025 and 1026 operate as mentioned above. The operation of an arithmetic entropy coder for data compression is discussed in Witten et al., "Arithmetic Coding for Data Compression", Communications of the ACM, Volume 30, No. 6, June 1987, and in Laydon, Jr. et al., "An Introduction to Arithmetic Coding", IBM, J. Res. Develop., Vol. 28, No. 2, March 1984. The histograms for the arithmetic encoder comprise the so-called modelling unit. The counts in the histograms need not correspond to actual symbol counts, and are merely used by the arithmetic coder to form the current estimate of the probability distribution. Such a modelling technique is also described in Whitten et al., "Arithmetic Coding for Data Compression", noted above.

The coefficient values of the dominant copy of the subband decomposition are stored in a 512×512 memory array with the form indicated by FIG. 3. The encoding of the significance map for a given threshold is accomplished by the processes shown in FIG. 10 for the coefficients whose coordinates appear on the dominant list. Although it is the significance map that is actually encoded, the entire significance map is never actually produced at once. The ternary value of the current entry in the significance map is defined by the combination of the outputs of comparators 1006 and 1008, which comprises a three level quantizer with three output states. Two states are associated with the positive and negative outputs of comparator 1008 in response to the "YES" output of comparator 1006 that indicates a significant coefficient at the current threshold. The third state is associated with the "NO" output of comparator 1006, indicating an insignificant coefficient in the dominant copy of the subband decomposition at the current threshold. The entries of the significance map corresponding to insignificant data are coded by means of a compression technique using zerotree structures developed when comparator 1006 indicates that a given coefficient has a magnitude less than or equal to the current threshold, as will be discussed.

Figure 11:
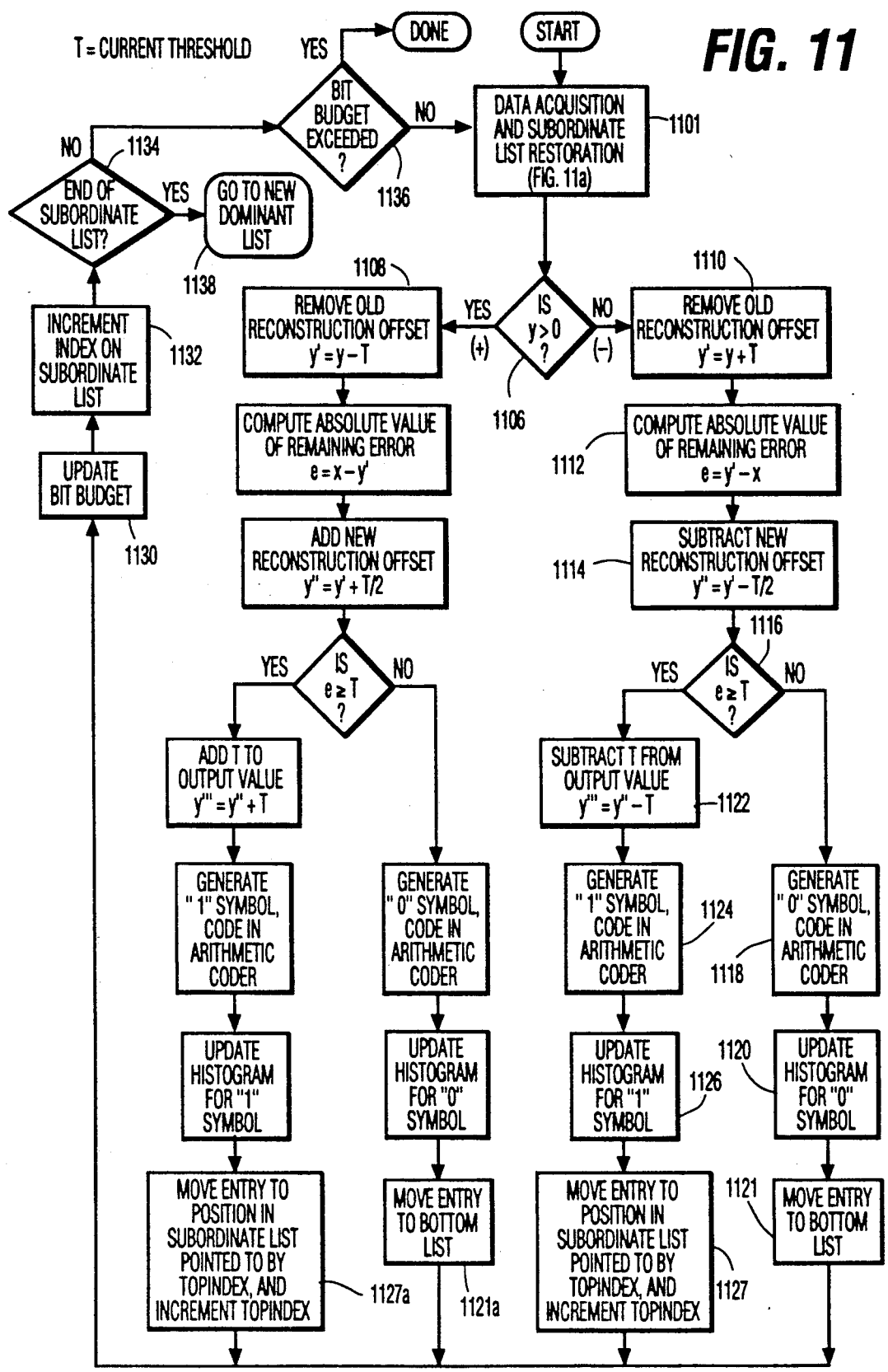

After the significance map for a given threshold is encoded, the subordinate list contains the coordinates of all coefficients found to be significant at the current threshold or any previous threshold. At this point the threshold is reduced and the errors, which are the differences between the values contained in the original copy of the subband decomposition and the output map values, are re-evaluated at the new threshold. Furthermore, the order of processing coefficients on the re-evaluation, i.e., an updated new subordinate list, replaces the previous subordinate list. The new ordering, based solely on information contained in the output map (which the decoder also produces), places those coefficients that the decoder would know to be larger in magnitude ahead of coefficients that the decoder would know to be smaller. This process is illustrated by FIG. 11, as will be discussed.

Information in the bitstream is intended to be encoded and decoded in order of importance progressively, from most important to least important, to facilitate the use of the disclosed system in a progressive transmission system whereby the most important information is encoded or decoded first. The precise definition of importance will be discussed presently. The order of importance is initially dictated by the scanning order of the original dominant list. Amplitude information is considered to be more important than frequency information such that among equal amplitudes low frequency information dominates, and otherwise larger amplitude dominates. The original dominant list, the format of which is set by a convention such as shown in FIG. 3, is known to encoder and decoder and determines the a priori ordering of importance. Decisions of ordering must be made based only on information that can be reproduced at the decoder. When discussing the relative magnitudes of coefficients for determining order of importance, the magnitude is taken to be that contained in the output map since that information is available at the decoder. Information, including significance map entries and refinements of significant coefficients, identified at a larger threshold is always encoded in the bitstream before information identified at a smaller threshold. Prior to evaluation by comparators 1006 and 1008, the output map entries corresponding to coefficients on the dominant list have value zero, whereby all coefficients are deemed to have equal magnitude of zero. For coefficients of equal magnitude, their relative order of importance is determined by the original dominant list, whereby coordinates of lower frequency coarser resolution coefficients precede coordinates of higher frequency finer resolution coefficients. When a coefficient is found to be significant and the significance map value (positive or negative) is coded, the coordinate of the coefficient is moved to the end of the subordinate list so that, in future refinements, it will be deemed more important than those coefficients not yet found to be significant, including those coefficients that will later be found significant at the current threshold. This movement occurs after encoding and thus is based only on information available at the decoder. When coefficients on the subordinate list are refined, decisions on relative magnitudes of significant coefficients can be made based on output map values. Thus, two coefficients first found to be significant at the same threshold can have their relative orders changed if it is determined at later refinements that the coefficient originally located later in the original dominant list has a larger output map value magnitude than the coefficient originally located earlier in the original dominant list.

As a result of such amplitude and frequency prioritizing of information, the decoder bit rate can be independent of the encoder bit rate, and the decoder can stop decoding an input bitstream at any point in the bitstream and reconstruct a signal of a quality commensurate with the amount of bitstream truncation present when decoding stops. Stopping decoding early in the bitstream produces less decoding of bitstream information, more data error, and "coarser" reconstructed data, which may be acceptable or even desirable depending upon the nature of the data review and utilization process. Conversely, terminating coding late in the bitstream yields more decoded data, less error, and "finer" reconstructed data. To this end, the coordinates of coefficients found to be more important appear toward the beginning of the subordinate list, while the coordinates of coefficients found to be less important appear toward the end of the subordinate list. Illustratively, the subordinate list entries produced after the first coding pass designate those coefficients that exceed the first (largest) threshold. These coefficients are the most important. The subordinate list entries produced after the next coding pass, at a smaller threshold, are less important and are added beginning at the end of the list, following the last entry entered from the prior coding pass. The only overhead in the entire bitstream is found in the short header portion of the bitstream.

Arranging the bitstream information in order of importance as mentioned is useful in a variety of applications. The transmission of information in order of importance results in an image representation displaying gradually increasing resolution and precision, thereby facilitating progressive transmission of image information. The system can be used in "browsing" applications where decoding can be stopped at any time when source information from a stored file becomes sufficiently recognizable at a coarse level. Very low bit rate compression is facilitated, as is precise decoder bit rate control to adaptively achieve a desired bit rate-versus-distortion trade-off. Arranging the bitstream bits in order of importance also leads naturally to prioritization for the purpose of providing layered protection schemes.

Figure 12:
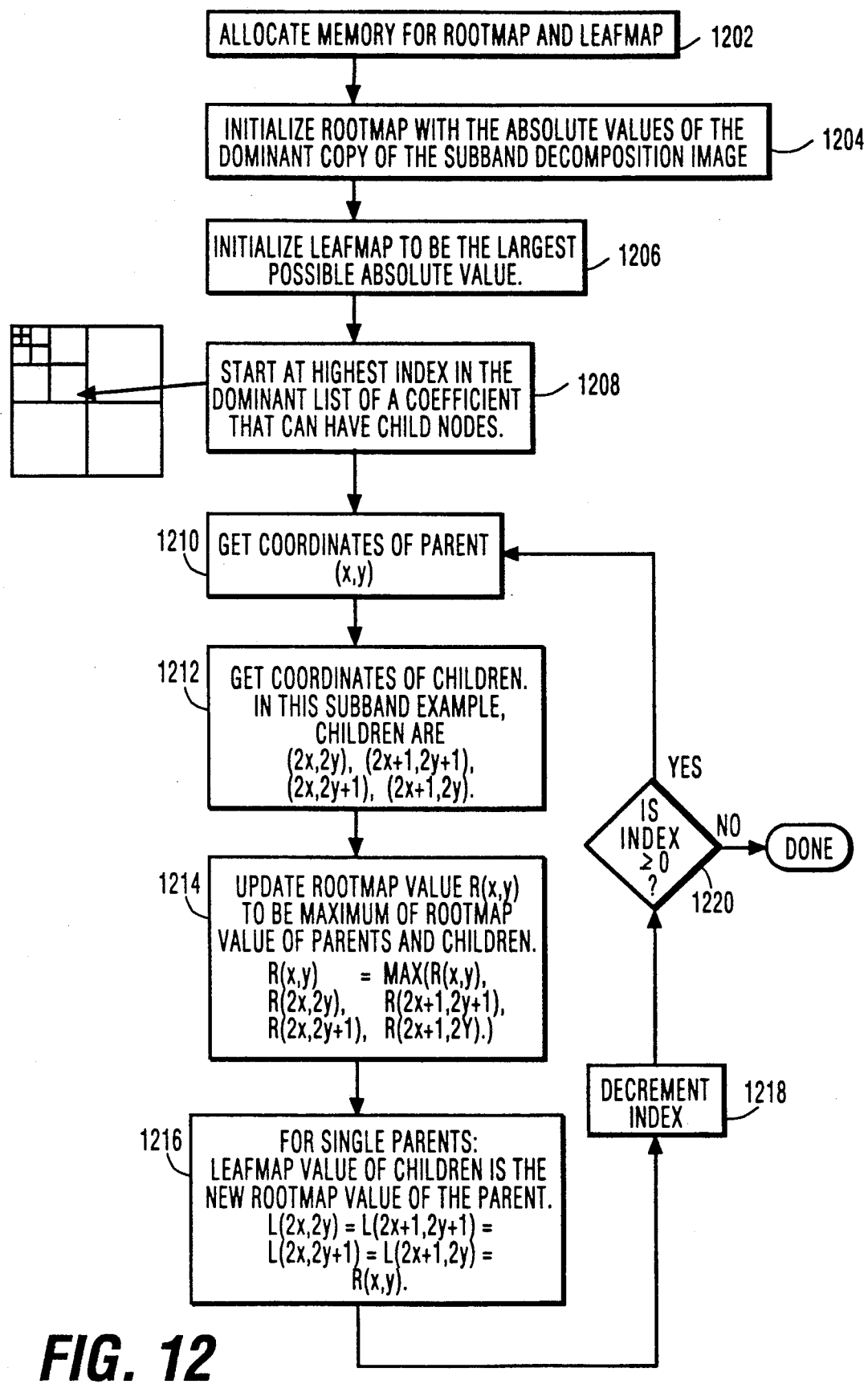

Returning to comparator 1006 in FIG. 10, a different coding path is followed if the absolute value of the current coefficient (X) of the dominant copy of the subband decomposition is found to be less than or equal to the current threshold. This result indicates an insignificant coefficient in the form of either an "isolated zero", a "zerotree root" or a predictably insignificant zero. Recall that to be a zerotree root a coefficient has to be insignificant in value, all of its descendants must be insignificant, and it must not itself be a descendant of a zerotree root. A current coefficient is characterized as an "isolated zero" when it is found to be insignificant, but one of its descendants is found to be significant in value. Otherwise the insignificance of the coefficient is predictable. This determination is aided by the use of a leafmap and a rootmap, which are specific types of companion image maps used by the coder to quickly determine whether a current coefficient is a root or a leaf of a zerotree structure. A zerotree structure is a related group of successive individual insignificant coefficients compactly represented by a single dedicated symbol. The specific manner in which rootmaps and leafmaps are generated is illustrated in FIG. 12 and will be discussed subsequently.

At the beginning of each pass through the dominant list, the rootmap and leafmap are recomputed simultaneously from the dominant copy of the subband decomposition and stored in the memory. There is a rootmap and a leafmap entry for each coefficient. The rootmap value for a given coefficient is the smallest threshold value for which the coefficient and all of its descendants would be insignificant. The leafmap value for a given coefficient is the smallest threshold value for which the coefficient would be a leaf in a zerotree, i.e., a descendant of a zerotree root.

Continuing with the coding path from the right hand ("No") output of comparator 1006 (indicating the presence of an insignificant value relative to the current threshold) unit 1030 obtains leafmap value L for the current coefficient. The leafmap value represents the smallest threshold for which the coefficient would be predictably insignificant. Comparator 1032 compares the leafmap value to the current threshold. A negative ("No") result, i.e., the leafmap value is less than or equal to the current threshold, indicates that an ancestor of the current coefficient is a zerotree root. No symbol is generated in this case, and the bit budget remains unchanged, since the insignificance of the coefficient is completely predictable from a previously coded zerotree root symbol. Whenever a zerotree root is coded, all of its descendants are implicitly coded at no additional cost. In the context of the successive approximation quantizer, a zerotree root implies that all coefficients in the original subband decomposition descending from the root are either insignificant, or are already known to be significant, i.e., they were found to be significant on a previous evaluation pass at a larger threshold.

A positive ("Yes") result from comparator 1032 indicates that the leafmap value exceeds the current threshold, in which case a corresponding rootmap value R is obtained by unit 1034. Comparator 1036 determines if the current coefficient is a zerotree root by comparing associated rootmap value R to the current threshold. A zerotree root is indicated if rootmap value R is less than or equal to the current threshold, in which case unit 1038 generates a "1" zerotree root symbol which is coded by the arithmetic entropy coder, and the arithmetic coder histogram is incremented for the zerotree root symbol by unit 1040. Similar operations are performed by units 1042 and 1044 if rootmap value R is found to exceed the current threshold, except that the coefficient is coded with a "0" symbol for an isolated zero.

When coding has progressed beyond one-quarter of the way through the original list of all subbands, the remaining coefficients are in the first level high frequency subbands (LH1, HL1 and HH1), where zerotrees do not occur due to a lack of descendants. At this point the modeling unit of the associated arithmetic coder is re-initialized with a new alphabet containing only symbols 0, 2 and 3 (zerotree symbol "1" having been deleted), and coding continues.

When a coefficient has been coded with either an isolated zero symbol or a zerotree root symbol, the associated coordinate is removed from the old (original) dominant list and added to a new dominant list by means of unit 1045. After a coefficient has been coded as significant or insignificant via one of the described paths, the bit budget is updated by unit 1046 by decrementing the current bit budget by the number of bits output from the arithmetic coder in response to its symbol input. Unit 1048 increments the index of the dominant list, after which comparator 1050 examines the incremented index to determine if the end of the list has been reached. If not, and if the bit budget has not yet been exceeded as indicated by comparator 1052, the coding process is repeated for the next coefficient by means of units 1002, 1004 and so on. The entire coding process ends when comparator 1052 indicates that the bit budget has been exceeded.

Unit 1050 includes means for recognizing a "terminal" subband, meaning a subband whose coefficients have no children and therefore cannot be a zerotree root. In such case the entropy coder histogram is reset to a new alphabet indicating a zero probability of a zerotree root, i.e., a "1" symbol cannot be coded. Also, if comparator 1032 indicates that leafmap value L exceeds current threshold T ("YES" output), coding proceeds directly to unit 1042, bypassing units 1034, 1036, 1038 and 1040 which do not apply in this situation.

When comparator 1050 indicates that the coefficient associated with the last index on the dominant list has been coded, a new threshold equal to one-half the previous threshold is generated by unit 1054, which is unit 916 in FIG. 9. Unit 1056 processes the subordinate list at the new, finer threshold to further refine the significant coefficients, as will be seen from the following discussion of FIG. 11.

At this point in the coding process, after all coefficients have been individually evaluated and coded in a first coding pass, the original dominant list has disappeared, and two new lists, the subordinate list and a new dominant list, have been developed as described above. The subordinate list contains the coordinates of coefficients of the original copy of the subband decomposition found to have a significant value, and the dominant list contains the coordinates of coefficients of the original copy of the subband decomposition found to have an insignificant value, both with respect of the preceding coarser threshold.

The subordinate list coefficients found to be significant on the first coding pass are further refined by the coding system illustrated by the flowchart of FIG. 11. Coding starts with unit 1101 which will be discussed in greater detail in connection with FIG. 11 a. Briefly, unit 1101 obtains the coordinate of the current coefficient on the subordinate list, the amplitude of that coefficient (X) from the original copy of the subband decomposition, and the corresponding coefficient (Y) from the output map. Recall that the output map was generated at steps 1010 and 1016 of the FIG. 10 coding system, by replacing initial zero values with values of 3/2 T or −3/2 T for all significant coefficients on the first coding pass. In FIG. 11 the current threshold is one-half the threshold of FIG. 10. Unit 1101 also performs a subordinate list restoration function in conjunction with a sorting function performed by units 1121, 1121a, 1127 and 1127a, as will also be discussed in connection with FIG. 11.

Comparator 1106 determines if output map value Y is greater or less than zero, i.e., positive or negative. If Y is positive, unit 1108 removes the previously installed positive reconstruction offset by subtracting smaller current threshold T. Similarly, if Y is negative, unit 1110 removes the previously installed negative reconstruction offset by adding smaller current threshold T to Y, producing output map value Y'. The old reconstruction offsets are removed because new, smaller offsets based on the smaller current threshold will subsequently be added. Unit 1112 determines the absolute value of a remaining error "e" by computing the absolute value of the difference between coefficient value X and corresponding output map coefficient Y' from unit 1110, i.e., without the reconstruction offset. Unit 1114 provides a new reconstruction offset by subtracting a factor $\frac{1}{4}$ T, i.e., one-half the current threshold, from output map coefficient Y, producing a refined new output map coefficient Y".

Comparator 1116 determines another level of precision by comparing error value e to the current threshold. If the value of error e is less than the current threshold, unit 1118 generates a "0" symbol that is coded in the subordinate list bitstream by the arithmetic entropy coder. Unit 1120 updates the histogram for this symbol, and unit 1121 performs a sorting function by moving the entry for the current index to the BOTTOM LIST. Unit 1121a operates similarly with respect to the processing of a positive output map value under unit 1108. The "0" symbol produced by unit 1118 and a "1" symbol to be discussed immediately below differ from the "0" and "1" symbols used in FIG. 10 for coding the dominant list bitstream. In other words, the coders for the dominant and subordinate lists use different alphabets with different histograms. In FIG. 11, a "0" symbol indicates that the bottom half of a quantization range (bin), i.e., closer to zero, is to be used, while a "1" symbol indicates that the top half of the quantization range is to be used. The quantization range is determined by the upper and lower limits of the previous threshold. If comparator 1116 indicates that the value of error e is greater than or equal to the current threshold, unit 1122 subtracts the current threshold from Y", producing output map coefficient Y'" A "1" symbol is generated by unit 1124 and coded by the arithmetic entropy coder, the histogram for this symbol is updated by unit 1126, and unit 1127 performs a sorting function by moving the current entry to the position in the subordinate list indicated by a pointer TOPINDEX. Unit 1127 then increments the TOPINDEX pointer. Unit 1127a performs a similar function in the path under unit 1127a.

An analogous procedure is followed in the coding path below unit 1108, when Y exhibits a positive value.

Unit 1130 decrements the bit budget by subtracting the number of output bits produced by the arithmetic coder in response to an input symbol, and unit 1132 selects the next index on the subordinate list. Comparator 1134 determines whether or not the subordinate list has been completely scanned by this time. If not, but if comparator 1136 determines that the bit budget has been exceeded, coding ends. Coding continues via units 1101, 1106, etc. for the coefficient associated with the next index on the subordinate list if a bit budget balance remains. Otherwise, coding ends.

When comparator 1134 indicates that the end of the subordinate list has been reached, the new dominant list is coded as indicated by block 1138 and as described in connection with FIG. 10, using the same current threshold that was used for coding the subordinate list as just described. Thus at this point, the original dominant list has disappeared after being coded at the coarse first threshold, as a result of which a new dominant list and a subordinate list were produced. These two lists were coded using the finer second threshold, and are subjected to coding at progressively finer threshold levels until the bit budget is depleted and coding stops.

When the coefficients associated with the subordinate list are refined at progressively finer thresholds after the first subordinate list is developed, list entries associated with output map coefficient values may not appear in a desired order of importance, (e.g., magnitude) from the most important at the beginning of the list to the least important at the end of the list. The desired ordering is obtained by a sorting function performed by units 1121, 1121a, 1127 and 1127a in FIG. 11 together with a subordinate list restoration function performed by unit 1101 in accordance with the flowchart shown in FIG. 11a. The units of FIGS. 11 and 11a code the coefficients of the subordinate list, transmit the coded coefficients, and sort the subordinate list in order of importance before refinement at the next threshold, in that sequence. More specifically, these units divide the subordinate list into prioritized sublists arranged in order of magnitude. Each sublist is a group of contiguous entries whose output map values have equal magnitude before refinement. An identical subordinate list sorting and restoration function is performed at the decoder.

Figure 11A:
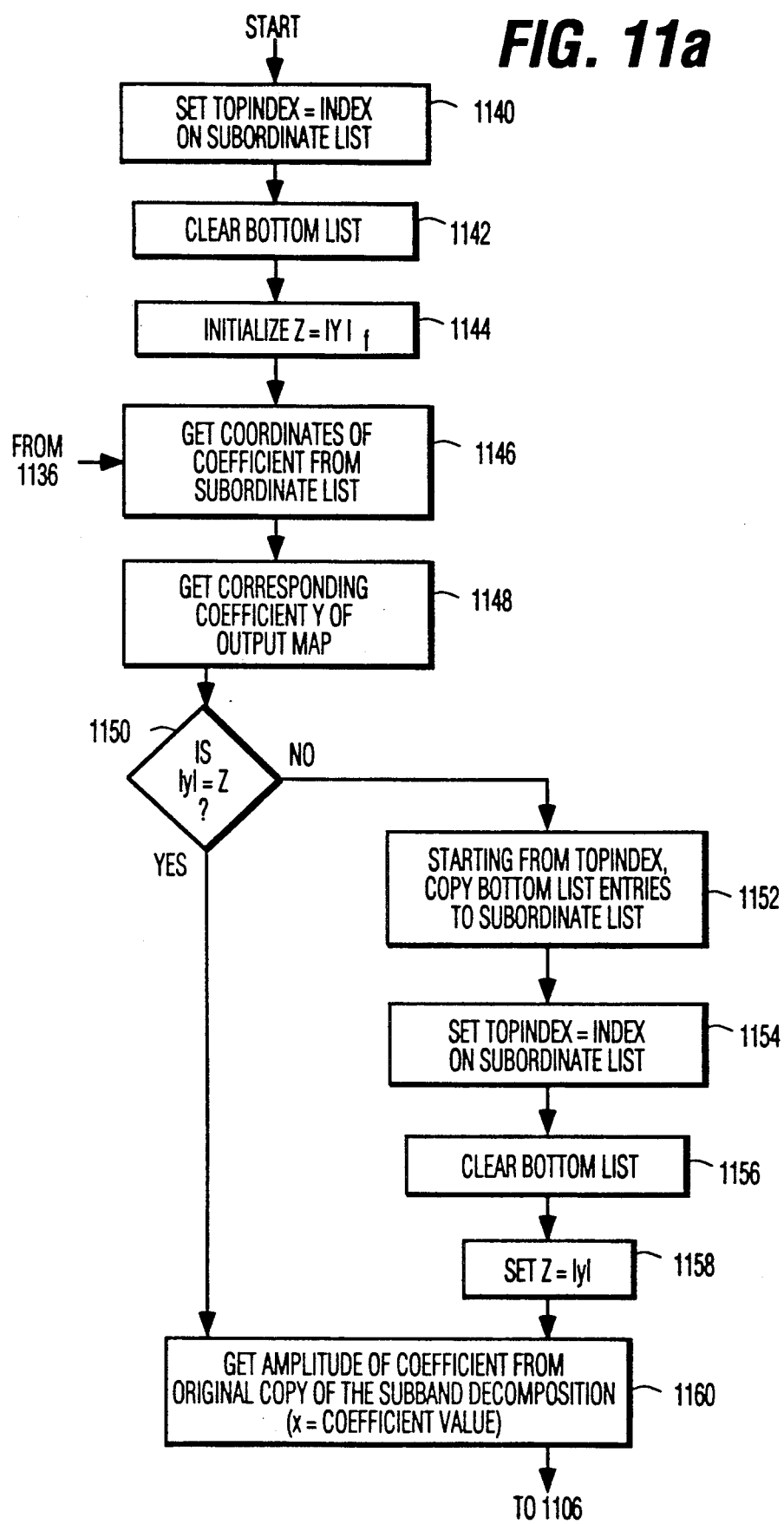

In the FIG. 11a flowchart, processing begins by initializing pointer TOPINDEX to point to the first index on the subordinate list. Recall that each index on the subordinate list specifies the position in the list of a given entry. Each entry designates the coordinates of an associated element of the subband decomposition for which a coefficient has been generated and placed in memory at a prescribed address. Thus for a given coordinate, the addresses of both the associated original image coefficient and the output map coefficient can be determined. Unit 1142 provides a BOTTOM LIST memory array which is cleared to be ready to accept entries as will be discussed. Unit 1144 initializes a factor Z to be equal to the absolute value of Yf, which represents the magnitude of the output map coefficient value associated with the entry at the first index on the subordinate list. Factor Z subsequently is assigned values representing the magnitudes, before refinement, of certain other output map values as will be seen. Unit 1146 obtains the index for the current coefficient, and unit 1148 obtains the value for the corresponding output map coefficient value (Y) using the entry data associated with the first index.

Comparator 1150 detects a change in the value of output map magnitude Y by comparing the absolute value of Y with Z. No change is indicated if these magnitudes are equal, and processing continues by obtaining the amplitude (X) of the current coefficient of the original copy of the subband decomposition via unit 1160 and proceeding to unit 1106 in FIG. 11. Units 1121 or 1121a move the current entry to the BOTTOM LIST memory when a "0" symbol is sensed, indicating that the true input value in situated is the lower half of the quantization range. Units 1127 or 1127a move the current entry to the position in the subordinate list pointed to by TOPINDEX when a "1" symbol is sensed, indicating that the current input value is situated in the upper half of the quantization range, and the pointer is incremented. When no change is indicated by comparator 1150, the TOPINDEX pointer points to the position in the subordinate list to which an entry would be moved when a "1" symbol is detected.

A change in the output map magnitude and therefore the beginning of the next sublist are indicated when comparator 1150 determines that the values of Y and Z are unequal. At such time the TOPINDEX pointer indicates the position in the subordinate list at which the BOTTOM LIST entries are copied into the subordinate list, which is accomplished by unit 1152, thereby completing the sorting operation for that sublist. Unit 1154 increments the TOPINDEX pointer so that it points to the index at the beginning of the next sublist, i.e., to the index immediately following the index associated with the last BOTTOM LIST entry. Unit 1156 clears the BOTTOM LIST memory, and unit 1158 sets factor Z equal to the absolute value of output map value associated with the index at the beginning of the next sublist. The amplitude of the current coefficient is obtained by unit 1160, and processing continues via unit 1106 and FIG. 11.

FIG. 12 illustrates the process of generating the rootmap and leafmap used in the coding system of FIG. 10. Unit 1202 initially allocates memory for two images, the rootmap and the leafmap, each having the same format as the subband decomposition image being coded. Unit 1204 initializes each rootmap entry with the absolute value of the corresponding entry in the dominant copy of the subband decomposition. Unit 1206 simultaneously initializes each leafmap entry with value M, the largest possible amplitude value from among all of the subband image coefficients (except LL1 and LL2) at all decomposition levels. This is particularly necessary in the case of child coefficients having multiple parents (a situation not presented in this example). In the case of a multidimensional signal such as an image signal, multiresolution representations typically can alter the resolution in each dimension independently. Therefore one variant would be for a child coefficient to have multiple parent coefficients in different dimensions. The leafmap initialization performed by unit 1206 is not necessary in the case of single parent coefficients. The rootmap and leafmap values may be computed simultaneously since they involve comparisons of the same subband image coefficients.

To efficiently compute the rootmap and leafmap values, processing begins at the highest frequency at which a zerotree can occur, i.e., processing begins with subbands whose coefficients are the parents of coefficients in the highest frequency subbands. Since coefficients in the three highest frequency subbands (LH1, HL1 and HH1) have no descendants and therefore cannot be zerotree roots, processing begins at the highest dominant list index that is one-quarter of the way through the list, as indicated by unit 1208. This index point is the highest index in subband HH2, which is the highest frequency subband in which a zerotree root can occur as shown in the small subband decomposition illustration to the left of unit 1208, and is the highest index (parent) coefficient that can have child coefficients. Coding proceeds backwards from this index toward lower frequency coefficients.

After the index of the beginning parent coefficient is obtained by unit 1210, the indices of the associated children coefficients are obtained by unit 1212. Specifically, for each parent coefficient at coordinate (x, y) in the reverse scanning of the dominant list from high to low frequency coefficients, the four child coefficients are located at coordinates (2x, 2y), (2x+1, 2y+1), (2x, 2y+1) and (2x+1, 2y). This relationship is illustrated in FIG. 3 (see also FIG. 1 regarding the parent-child relationship). In this example the parent coefficient at coordinates (255, 255) of subband HH2 is associated with child coefficients at coordinates (510, 510), (511, 511), (510, 511) and (511, 510) in subband HH1.

Unit 1214 updates the rootmap value at parent coordinate R(x,y) to equal the maximum of the current parent value and the rootmap values of all the corresponding children. In the case of child coefficients having a single parent as in the illustrated example, unit 1216 updates the leafmap values at each of the four child coordinates to equal the parent rootmap value as determined by unit 1214. That is, the leafmap entries for all child coefficients are made equal to the R(x,y) rootmap entry of the parent coefficient. However, when a child coefficient has multiple parents, the leafmap entry for such child, L (child), is made equal to the minimum of the current leafmap entry for such child and the rootmap entry R(x,y) of its parent.

In this example rootmap development begins by processing second level subbands HH2, HL2 and LH2 as parents, then processing third level subbands HH3, HL3 and LH3 as parents, then processing subband LL3 as a parent to LH3, HL3 and HH3. Leafmap development starts by processing first level subbands HL1, LH1 and HH1 as descendants with respect to the corresponding subbands in level 2, then processing level 2 subbands HL2, LH2 and HH2 as descendants with respect to the corresponding subbands in level 3, then processing level 3 subbands HL3, LH3 and HH3 as descendants of the lowest frequency band, LL3.

With the exception of the illustrated highest frequency subbands, which cannot be parent subbands, and the lowest frequency subband, which cannot be a child subband, the above procedure is applied to each subband once as a parent subband, and at least once as a child subband since in the case of multidimensional subbands a child coefficient may have more than one parent coefficient. Coefficients are evaluated as parents before they are evaluated as children, and the rootmap and leafmap are complete after the lowest frequency subband is evaluated as a parent subband.

After the leafmap and rootmap values have been determined for a given parent coordinate in the subband decomposition, unit 1218 decrements the index of the dominant list by one and the resulting new index is examined by comparator 1220. If the new index is greater than or equal to zero, the procedures for generating a rootmap and a leafmap are repeated for the new parent index. Otherwise, if the decremented index is found to be less than zero, the leafmap/rootmap generating process stops. Specifically, processing stops after the lowest frequency subband has been completely evaluated as a parent subband.

The coefficient evaluation and coding system thus far described can be expressed using the following relationships, where T is the current threshold, X is the absolute value of the current coefficient of the dominant copy of the subband decomposition, R is the rootmap value for the current coefficient and L is the leafmap value for the current coefficient. The current coefficient of the dominant copy of the subband decomposition is

| a) predictably insignificant if | $L \leq T$, |
| b) the root of a zerotree if | $R \leq T < L$, |
| c) significant if | $X > T$, or |
| d) insignificant but has a significant descendant, i.e., the coefficient is an isolated zero | $X \leq T < R$ |

Figure 13:
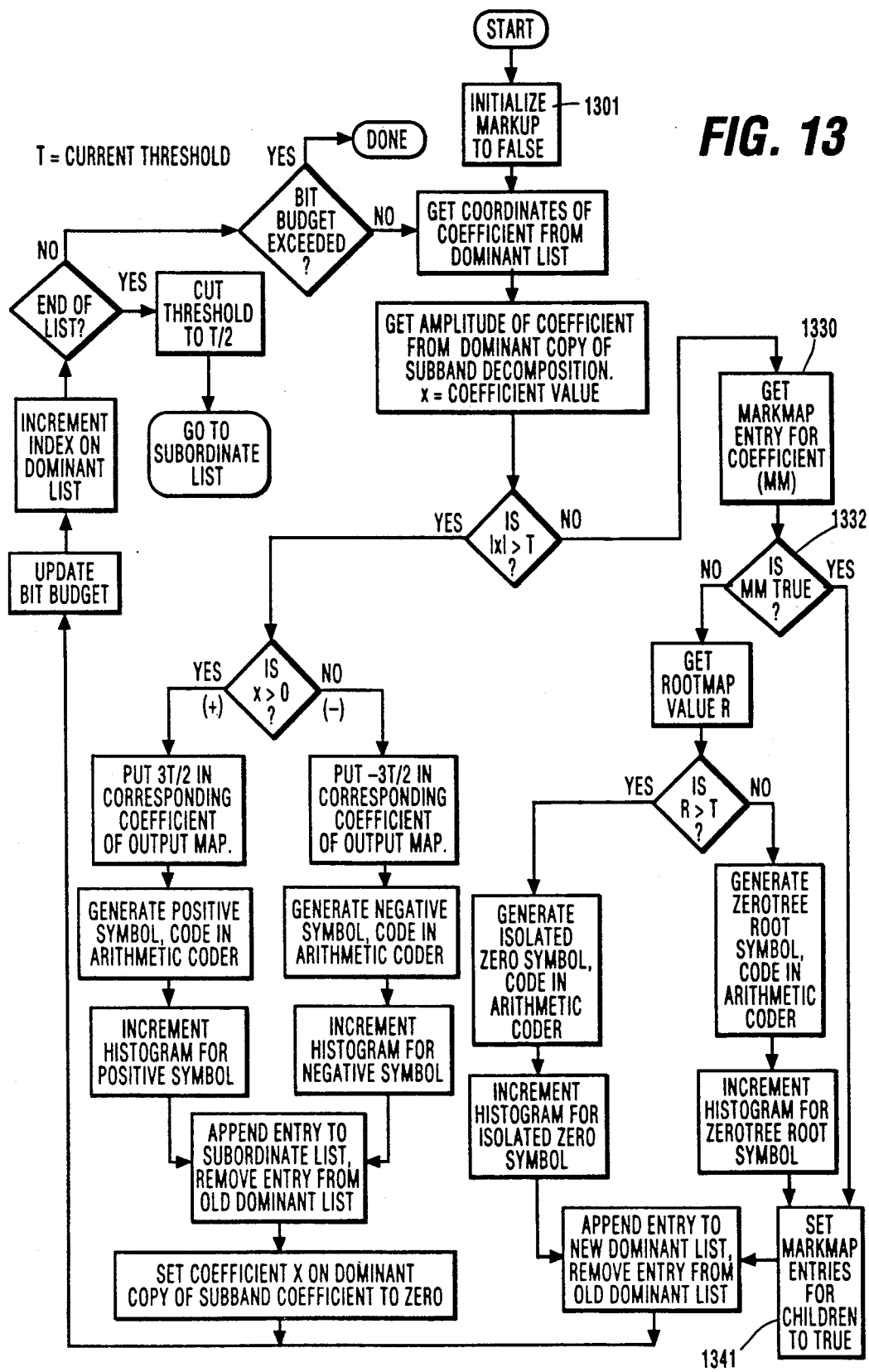
FIG. 13 represents a variant of the flowchart shown in FIG. 10.

The generation of a leafmap is particularly advantageous because the leafmap can be easily generated simultaneous with the generation of the rootmap and allows faster operation because of fewer memory accesses. A slower alternative to the use of a leafmap that requires less memory storage but more memory access time is illustrated by the flowchart of FIG. 13. This flowchart is similar to that of FIG. 10 except that units 1030 and 1032 in FIG. 10 have been deleted and replaced by units 1330 and 1332 in FIG. 13. Also, units 1301 and 1341 have been added in FIG. 13. Related FIG. 12 remains unchanged except that leafmap generation units 1206 and 1216 have been deleted.

Units 1330, 1332 and 1341 define a "markmap" approach for developing a companion map to indicate the predictability of child coefficients. A markmap is a map of all coefficients that are descendants of zerotree roots, with each map entry having been "marked" previously in the coding process to indicate if it is the descendant of a zerotree root. Unit 1330 obtains a "markmap" entry (MM) for the coefficient being processed, after the markmap is initialized to FALSE by unit 1301. Comparator 1332 evaluates markmap entry MM to determine if it is a predictably insignificant ("TRUE") coefficient. If the coefficient is found to be predictably insignificant, unit 1341 sets the markmap entries of each associated child coefficient to TRUE, indicating that they too are predictably insignificant. Similar entries are made if the adjacent zerotree root coding path codes a zerotree root symbol. In other words, unit 1341 designates child coefficients as predictably insignificant without additional coding if unit 1330 finds the parent coefficient to be either predictably insignificant or a zerotree root. The system of FIG. 13 otherwise operates in the same manner as the system of FIGURE 10.

Figure 14:
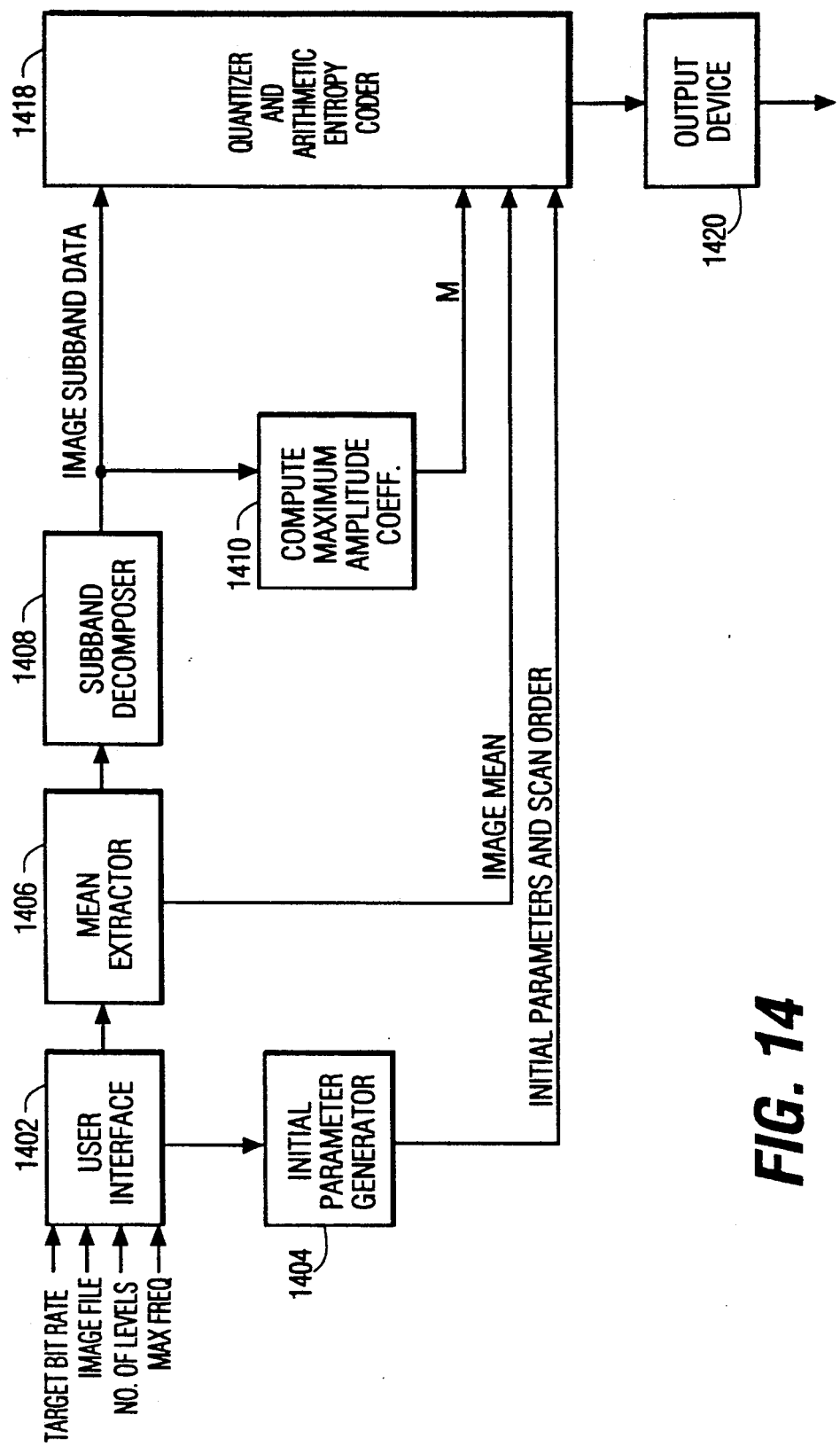
FIG. 14 is a block diagram of an encoder for aspects of a decoding system according to the present invention.

FIG. 14 is a block diagram of apparatus that may be used to implement the described data compression system, including a zerotree compression structure together with a successive approximation quantizer and entropy coder.

A user interface 1402 receives a plurality of input values as determined by a system operator. Interface 1402 may include dedicated memory devices such as registers for respectively storing the input values. An input "image file" is an M×N image map with a header indicating image height and width. A "Number of levels" parameter specifies the number of pyramid decomposition levels, three in this example. A "target bit rate" parameter specifies the desired bits/pel, which may be a function of the modem rate, memory size or the amount of tolerable distortion, for example. A "maxfreq" parameter determines how often a histogram associated with an arithmetic entropy coder's modelling unit in unit 1418 is downdated. In Witten et al. this is accomplished by incrementing all possibilities, dividing by two and truncating fractions.

User defined parameters from interface 1402 are read into an initial parameter generator which allocates memory for images and parameters, and encodes the parameters in the header of a bitstream that is sent to coder unit 1418. Unit 1404 initializes bitstream values for each parameter based upon data received from interface 1402. An input image map is provided from interface 1402 to a mean extractor 1406 which computes the mean of the image, subtracts the mean from the image, and codes the image mean value for separate transmission to coder 1418. The mean value may follow the initial parameter values in the bitstream header. A zero-mean image signal from unit 1406 is applied to a subband decomposer 1408 for developing image subband components LL, LH, HL and HH as previously explained in connection with FIG. 2. The subband components are provided to coder 1418, as explained in connection with FIGURE 10. The maximum coefficient amplitude CM") from among all subband images is computed by unit 1410 and conveyed to unit 1418 for coding. Unit 1418 may be a microprocessor based device including successive approximation quantization and arithmetic entropy coder apparatus for implementing the flowchart functions of FIGS. 9, 10 and 11. The arithmetic coder and an associated modelling unit combine to form an adaptive entropy coder that produces a compressed bitstream in response to input symbols. The modelling unit contains a histogram of symbol occurrences representing probabilities that will be used by the arithmetic coder. The modelling unit and histogram also allow for an additional symbol, not used to code image information, indicating the end of the bitstream. An output bitstream from coder 1418 is provided to an output device, e.g., a modem or tape/disk storage media.

Figure 15:
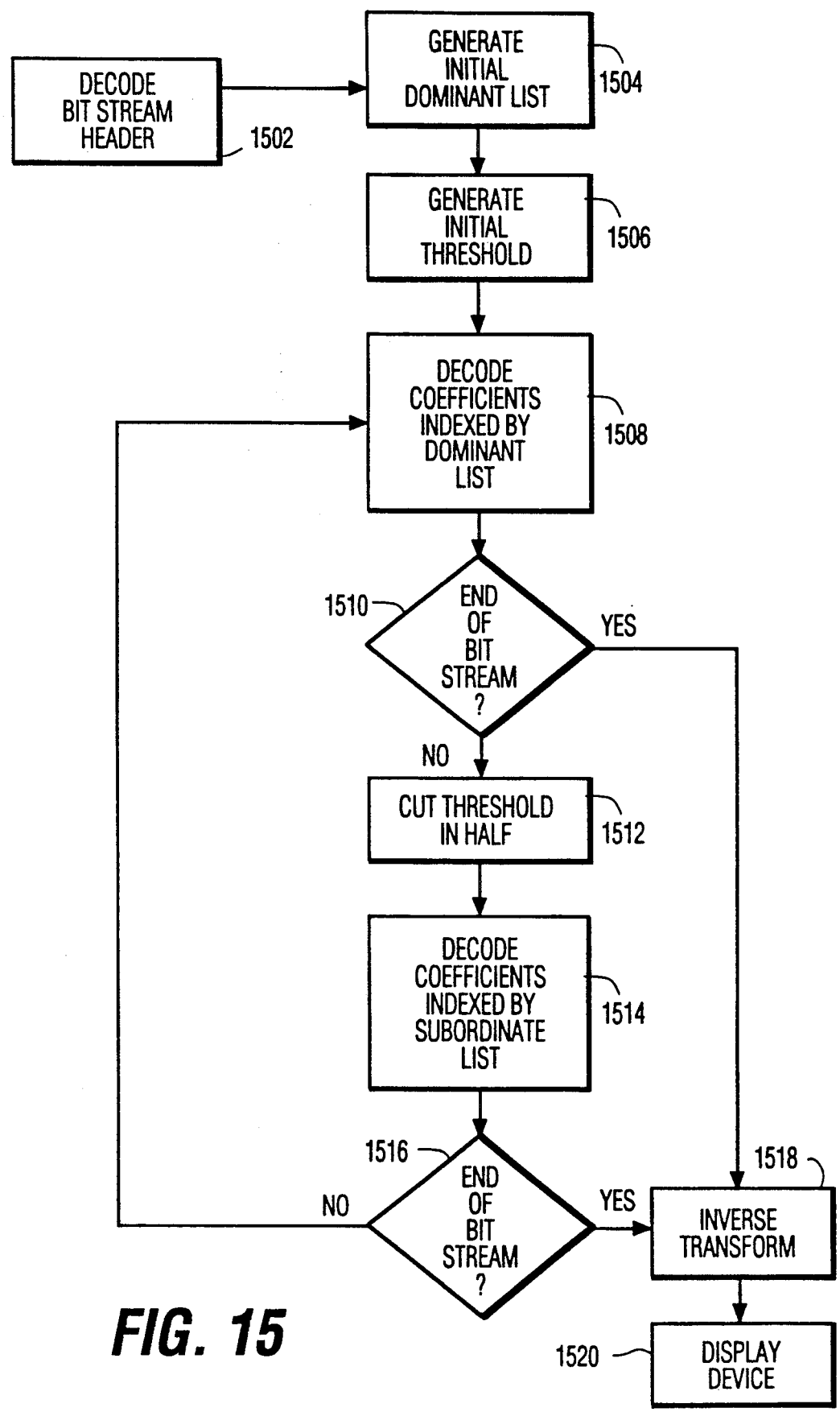
FIGS. 15-17 are flowcharts depicting various aspects of a decoding system according to the present invention.
Figure 16:
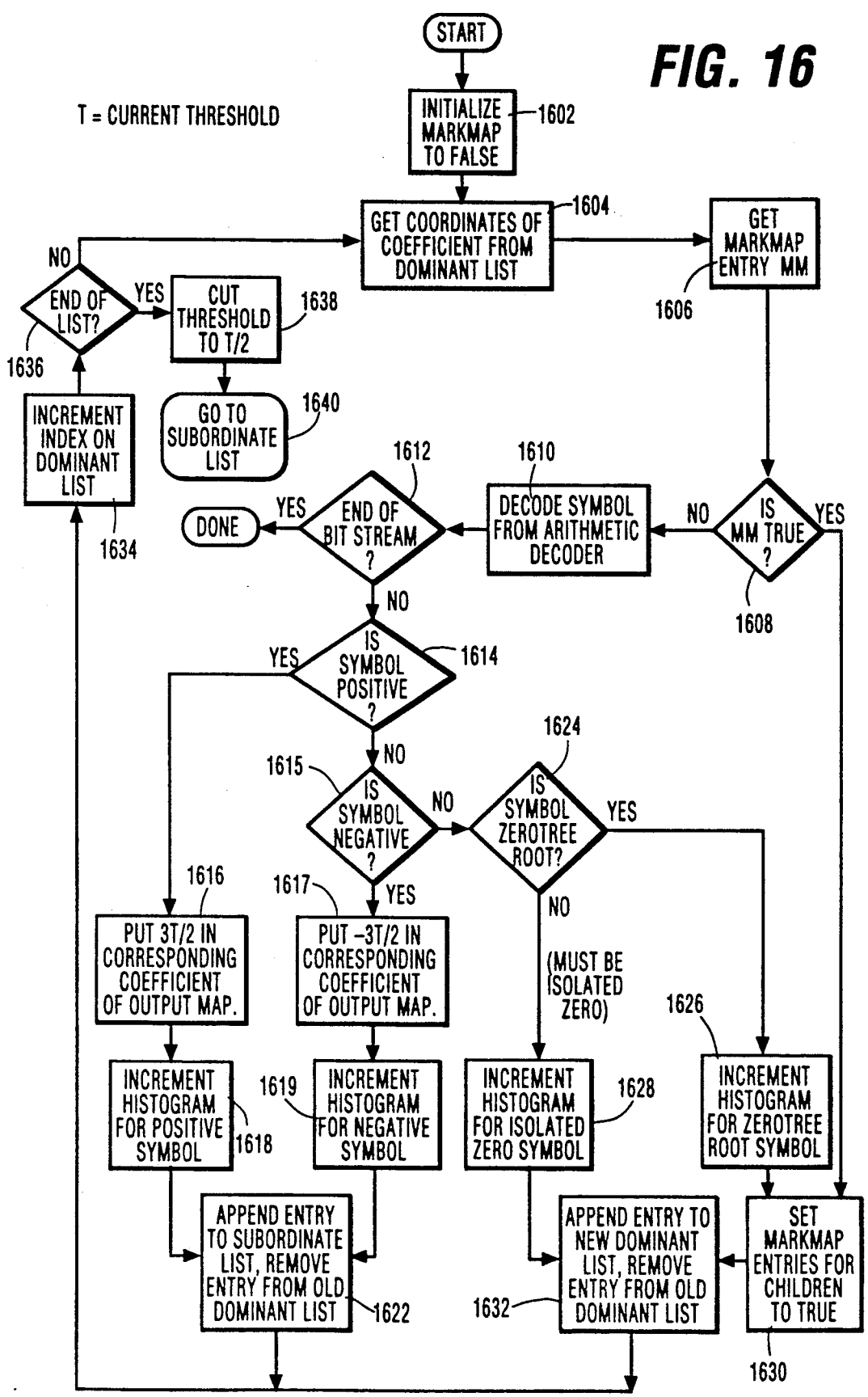
Figure 17:
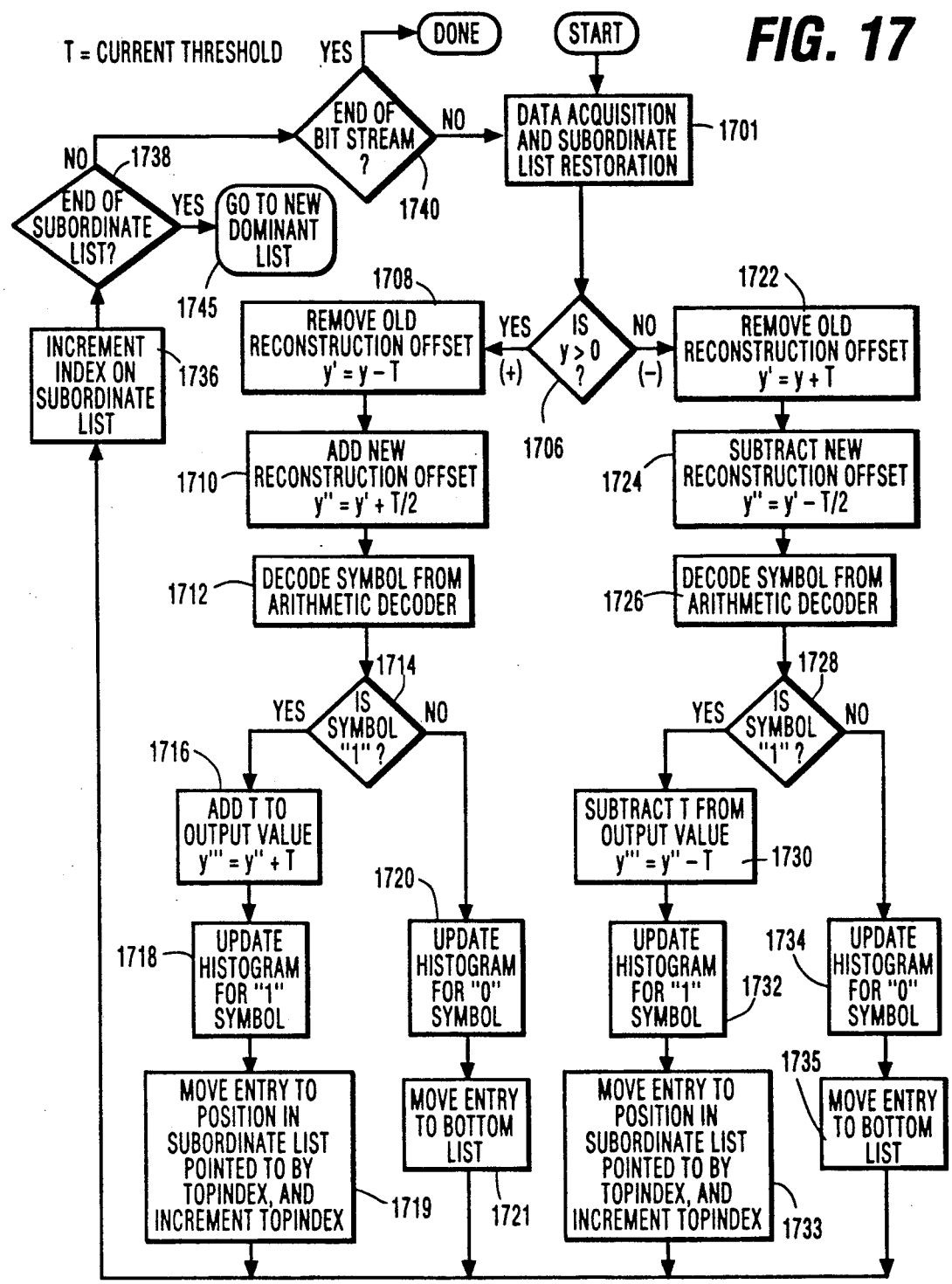

FIG. 15 is a flowchart of the general decoding process, specifics of which are shown in FIGS. 16 and 17. An entropy coded bitstream is received by a decoder input unit 1502 for decoding the bitstream header data, which includes the number of transform (pyramid) levels, the width and height of the image, the image mean value, the updating frequency for the histogram associated with the entropy decoder, the initial threshold, the scan order, and other data and parameters mentioned in connection with FIG. 14. The arithmetically coded image decomposition bitstream follows the header.

Unit 1504 generates an original dominant list containing coordinates for all of the 262,144 (512×512) subband coefficients in accordance with the image size data contained in the header. These coordinates are arranged in the sequence determined by the scanning order (subband processing sequence) shown in FIG. 3, and in accordance with a horizontal, vertical or "space filling" scanning pattern for respective ones of the ten subbands, so as to duplicate the scanning order and patterns used at the encoder. Unit 1506 generates the initial threshold level in response to header data, and entries of a locally generated output map are initialized to zero. The output map is of the form shown in FIG. 3.

Decoder 1508 evaluates the entropy coded bitstream data for each of the 262,144 indices at the initial threshold. This operation produces a subordinate list of significant coefficient coordinates and a new dominant list of insignificant coefficient coordinates, as will be discussed in greater detail with respect to FIGS. 17 and 16 respectively. The output map is updated with the current estimates of coefficients found to be significant at the initial threshold.

Comparator 1510 indicates whether or not the end of the bitstream has been reached by sensing a unique end-of-bitstream symbol. In this example it is assumed that an image will be inversely transformed by unit 1518 and displayed by display device 1520 only after the entire bitstream has been decoded, as indicated by the end-of-bitstream symbol. The image to be inversely transformed is derived from the output map. Alternatively, bitstream data may be progressively inverse transformed and displayed to provide image displays at progressively finer resolution. This can be accomplished by enabling the inverse transform and display operations to produce displayed images progressively, after every sequence of a decoded dominant and subordinate list, in response to programming at the decoder for example. Inverse transform unit 1518 performs the inverse of the transform performed by the subband decomposer in FIG. 2.

If the end of the bitstream has not been reached after the dominant list has been processed by decoder 1508, unit 1512 produces a new threshold equal to one-half the prior threshold. This is done when unit 1512 senses that the last coordinates on the (original or current) dominant list has been evaluated. Unit 1514 evaluates and decodes the coefficients indexed by the subordinate list at the current (new) threshold, and updates the output map with the results of the evaluation. Image data from the output map are inversely transformed and displayed if comparator 1516 senses the end of the bitstream. Otherwise, unit 1508 evaluates the coefficients associated with the coordinates on the new dominant list, at the current threshold. Decoding continues in this manner at progressively smaller thresholds until the end of the bitstream is sensed.

The flowchart of FIG. 16 illustrates additional details of the decoding process for the dominant list. Decoding starts by unit 1602 initializing all entries of a markmap with a FALSE value to indicate that initially no coefficient is predictably insignificant. The markmap has an entry for each of the 262,144 possible coefficients in this example. Unit 1604 obtains the coordinates of the first coefficient on the original dominant list, and unit 1606 obtains the markmap entry MM (initially "FALSE") for this coordinate. Comparator 1608 evaluates markmap entry MM to determine if it is TRUE and therefore predictably insignificant, or FALSE and therefore a symbol must be decoded. Initially, on the first decoding pass, MM is FALSE whereby decoder 1610 decodes the first symbol from an arithmetic entropy decoder included in the decoding system. At this point the entropy decoder produces output symbols in response to input binary bits received via the bitstream. The arithmetic entropy decoder contains the same model and histogram as the arithmetic entropy coder that formed the bitstream in response to symbols generated at the encoder. Comparator 1612 produces an output signal for terminating the decoding process if the end of the bitstream is sensed. If not, comparators 1614 and 1615 determine if the symbol is positive or negative. If the symbol is positive, unit 1616 adds a ½ T offset to the current threshold and places a value of 3/2 T in the corresponding coefficient location of the output map from which a reconstructed image will be developed for display. If the symbol is negative, unit 1617 places a value of −3/2 T in the corresponding coefficient location of the output map. Units 1618 and 1619 increment the entropy decoder histogram for positive or negative symbols as appropriate, and unit 1622 removes the current coordinates from the (original or current) dominant list and adds it to a subordinate list of coordinates of significant coefficients, in a manner analogous to that of encoder unit 1025 in FIG. 10.

If the evaluation by comparators 1614 and 1615 indicates that the current symbol is neither positive nor negative, comparator 1624 determines if the symbol represents a root of a zerotree. If it does, unit 1626 increments the decoder histogram for a zerotree root symbol. If not, the symbol must indicate an isolated zero, and unit 1628 increments the histogram accordingly.

When a zerotree root is decoded for a given coefficient, all of its child coefficients are marked as being insignificant. This is accomplished by unit 1630 setting the corresponding markmap entries for the children of the current coefficient to TRUE, indicating a predictably insignificant coefficient. A similar result is obtained when unit 1608 indicates that the markmap value at the location of the then current coefficient is TRUE, i.e., the current coefficient is predictably insignificant.

Unit 1632 removes the current entry from the old dominant list and adds it to a new dominant list of coordinates of insignificant coefficients. Unit 1634 increments the index on the (original) dominant list and, if comparator 1636 indicates that the last entry has not yet been processed, unit 1604 obtains the coordinates of the next coefficient and decoding continues as described above. Unit 1638 generates a new threshold equal to half the previous threshold when comparator 1636 indicates that the last entry on the dominant list has been processed. Decoding continues with respect to the subordinate list, as indicated by unit 1640 and as described in connection with FIG. 17.

In FIG. 17, decoding the subordinate list of significant coefficients starts with unit 1701, which includes means for obtaining the first coordinates and the corresponding output map coefficient (Y). Unit 1701 is similar to the apparatus illustrated by the flowchart of FIG. 11a, except that unit 1701 does not include a unit corresponding to unit 1160 in FIG. 11a. Unit 1701 performs a subordinate list restoration function in conjunction with a sorting function performed by units 1719, 1721, 1733 and 1735, which are functionally similar to units t 11278, 11218, 1127 and 1121 in FIG. 11. By means of units 1701, 1719, 1721, 1733 and 1735 the decoder performs a subordinate list sorting and restoration operation similar to that performed at the encoder. Comparator 1706 determines if the current coefficient is positive or negative. If positive, units 1708 and 1710 respectively remove the old reconstruction offset, and add a new reconstruction offset to produce a new output map value Y''. Unit 1712 decodes the associated symbol from the arithmetic entropy decoder, and comparator 1714 determines if the symbol (for a positive significant coefficient) is "1" or "0". If the symbol is "1", current threshold T is added to output map value Y'' to produce new output map value Y'' by means of unit 1716, and unit 1718 updates the histogram for this symbol. Unit 1719 moves the entry to the position in the subordinate list pointed to by the TOPINDEX pointer, and the pointer is incremented In the case of a "0" symbol, the histogram for this symbol is updated by unit 1720, and the output map value remains Y''. Unit 1721 moves the entry to the BOTTOM LIST. Units 1722–1735 operate when comparator 1706 indicates the output map coefficient is significant but negative. These units perform functions analogous to those performed by functionally equivalent units 1708–1721 respectively, except for differences in the sign of the threshold values used by units 1722, 1724 and 1730.

The value of output map coefficient Y is at the midpoint between the lower and upper limits of the quantization range (i.e., "bin") defined by the lower and upper limits of the previous threshold. The value of output map coefficient Y' is at the lower limit (closer to zero) of this range. Refined current threshold T is one-half the previous threshold. Current threshold T defines current lower and upper ranges, each T wide, between the upper and lower limits, with Y at the midpoint juncture of these ranges. Refined output map coefficient Y'' is at the midpoint of the current lower range, and refined output map coefficient Y'' is at the midpoint of the current upper range. Thus reconstruction values Y'' and Y'' are placed in the middle of the current lower and upper ranges, respectively. These values are offset from the lower and upper limits by an offset ¼ T, and are offset from the middle of the previous threshold range (where Y appears) by an offset ½ T.

Unit 1736 increments the subordinate list index, and comparator 1738 determines whether or not the last entry on the list has been processed. If not, and if comparator 1740 indicates that the end of the bitstream has not been reached, decoding proceeds for the coefficient at the incremented new index via units 1702, 1704, etc. If comparator 1738 indicates that the subordinate list has been processed completely, the new dominant list is obtained as indicated by block 1745 and decoded (FIGURE 16) at the current threshold. The decoding operation sequences between the subordinate and dominant lists until comparator 1740 indicates that the end of the bitstream has been reached, at which time decoding terminates.

Figure 18:
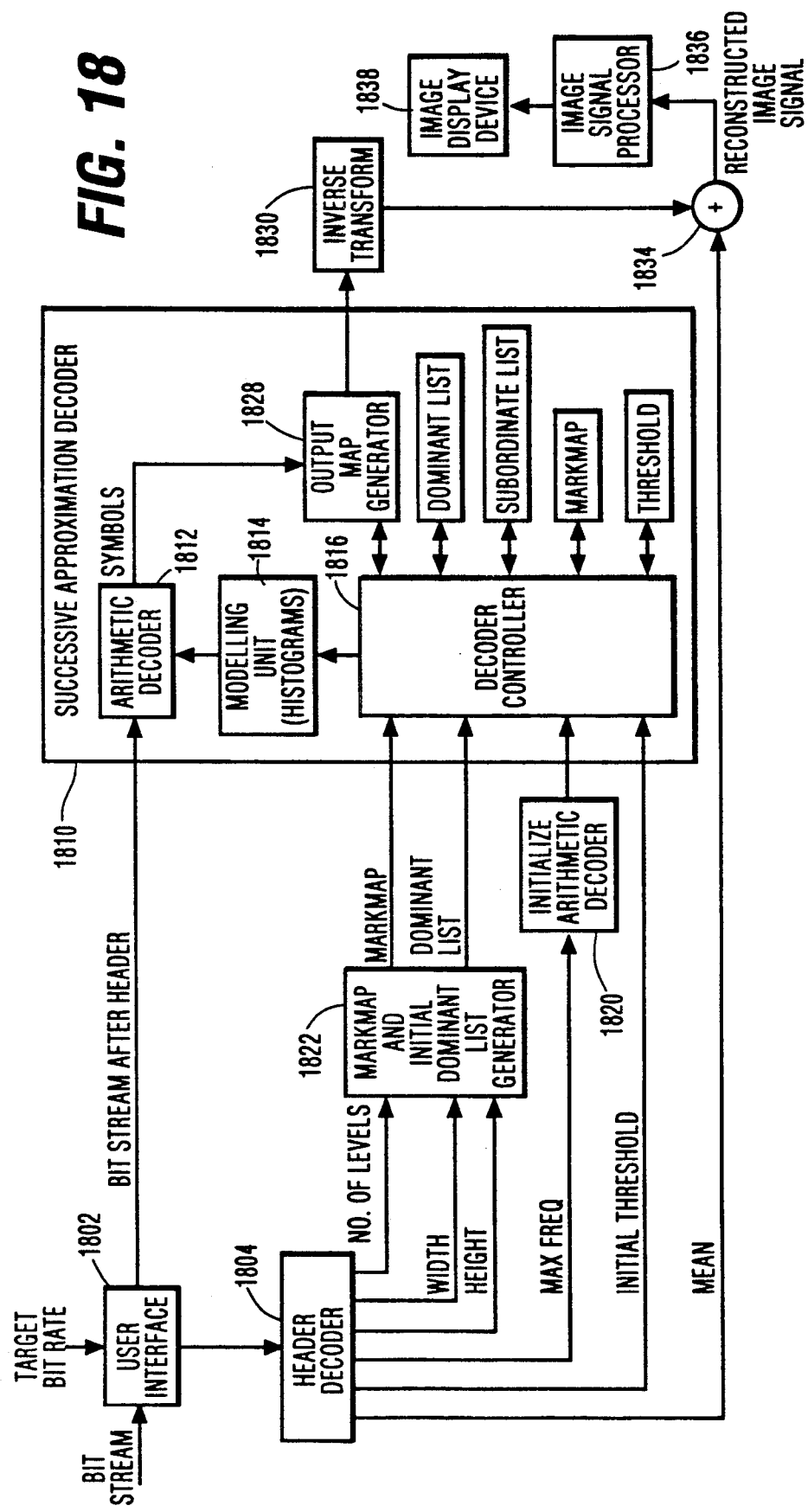
FIG. 18 is a block diagram of a decoder for implementing a system according to the present invention.

FIG. 18 is a block diagram that may be used to implement the decoder/decompression system discussed in connection with FIGS. 15–17.

A user interface receives a control signal representing a target bit rate from a system operator, and a compressed bitstream as developed by the coder apparatus. The target bit rate (bits/pel) can be chosen to permit the entire bitstream to be decoded, resulting in the highest resolution image, or to permit less than the entire bitstream to be decoded if an image with less resolution is desired. The bitstream header information is decoded by unit 1804, producing output signals representing the parameters for the number of decomposition (pyramid) levels, the image width and height, the updating frequency (MAXFREQ) of the histogram for the arithmetic decoder, the initial threshold level, and the image mean.

The bitstream component following the header is conveyed to a successive approximation decoder unit 1810. This unit includes an arithmetic entropy decoder 1812 that coacts with an output signal from an associated modelling unit 1814 containing the data processing histograms. Modelling unit 1814 responds to output signals from a decoder controller 1816 which may be a microprocessor based device that operates in accordance with the flowcharts of FIGS. 15–17. Controller 1816 operates in response to a markmap and initial list of dominant indices produced by a unit 1822, and in response to a signal from unit 1820 for initializing the histogram and arithmetic decoder operation at the beginning of bitstream decoding. Controller 1816 generates and coacts with a (revised) dominant list, subordinate list, markmap and various thresholds as discussed in connection with the flowcharts.

Output symbols from arithmetic decoder 1812 and information from controller 1816 are received by a unit 1828 for generating an output map from which an image to be displayed will be developed, as discussed in connection with FIG. 17. The coefficients of the output map generated by unit 1828 are inversely transformed by unit 1830. A transformed signal from unit 1830 is combined with the image mean information in adder 1834 for producing a reconstructed image signal. This signal is further processed as necessary by unit 1836 before being displayed by device 1838. Processor 1836 and device 1838 may be associated with a television receiver, for example. Inverse transform unit 1830 performs the inverse of the transform performed by the subband decomposer at the encoder (FIG. 2). Modelling unit 1814 exhibits the same characteristics as a corresponding modelling unit at the encoder, and arithmetic entropy decoder performs the inverse of the operation performed by the arithmetic entropy coder at the encoder.

What is claimed is:

1. A system for processing digital data comprising a plurality of image representative data elements, said system including:
   means responsive to said data elements for generating coefficients representing said data elements;
   means for evaluating said coefficients at successively finer threshold values from larger coarse values to smaller fine values to determine significant and insignificant coefficients, where a coefficient is significant if its magnitude exceeds a given threshold value;
   means responsive to coefficients evaluated by said evaluating means for representing information determined at previous coarse threshold values, said representing means comprising (a) a dominant list containing entries of evaluated coefficients that have not as yet been identified as significant at previous coarse threshold values; and (b) a subordinate list containing entries of evaluated coefficients that have been identified as significant at previous coarse threshold values;
   means responsive to an evaluated coefficient for generating a tree structure having a path from an evaluated coefficient at a level of coarse information to descendant coefficients generated at levels of relatively finer information, where coarse information represents low frequency image information over a given spatial area and fine information represents high frequency image information over a relatively smaller spatial area, each descendant coefficient represents an area corresponding to a portion of an area represented by a root of said tree structure;
   means for evaluating entries of coefficients on said lists for generating symbols inclining
   (a) a Positive symbol indicating that a coefficient on said dominant list is significant with respect to a current threshold value and exhibits a positive value;
   (b) a Negative symbol indicating that a coefficient on said dominant list is significant with respect to a current threshold value and exhibits a negative value;
   (c) an Isolated Zero symbol indicating that a coefficient on said dominant list is insignificant with respect to a current threshold, but that there is at least one descendant in the associated tree that is significant with respect to said current threshold value, said last named descendant being insignificant with respect to all prior larger threshold values; and
   (d) a Zerotree symbol indicating that a coefficient on said dominant list is insignificant with respect to a current threshold value, and that all descendants in the associated tree, except those found to be significant with respect to a prior larger threshold value, are insignificant with respect to said current threshold value; and
   means for coding said Positive symbol, said negative symbol, said Isolated Zero symbol and said Zerotree symbol to produce an output bitstream.

2. A system according to claim 1, wherein said coding means is an entropy coder for producing an output bitstream in response to input symbols.

3. A system according to claim 1, wherein said threshold values are successively halved.

4. A system according to claim 1, wherein
   said digital data represents an image composed of picture elements; and
   said system includes transform means for decomposing said image into a plurality of image representative subbands at each of plural decomposition levels, said transform means producing, for a group of picture elements, a coefficient representing a prescribed characteristic of said picture element group.

5. A system according to claim 4, wherein
   each said coefficient represents the amplitude of an associated picture element group.

6. A decoder system for processing a coded digital datastream representing a sequence of symbols identifying values of corresponding transform coefficients, comprising:
   means for evaluating said datastream at successively finer threshold values, form larger coarse values to smaller fine values, or providing coefficient related information;
   means for representing said coefficient information determined at previous coarse threshold values, said representing means comprising (a) a dominant list containing entries of coefficients that have not as yet been identified as significant at previous coarse threshold values; and (b) a subordinate list containing entries of coefficients that have been identified as significant at previous coarse threshold values; and
   means for evaluating, at respective threshold values, coefficient entries represented by said dominant list for providing symbols representing entries on said dominant list, said symbols including
   (a) a Positive symbol indicating that a coefficient on said dominant list is significant with respect to a current threshold value and exhibits a positive value;
   (b) a Negative symbol indicating that a coefficient on said dominant list is significant with respect to a current threshold value and exhibits a negative value;
   (c) an Isolated Zero symbol indicating that a coefficient on said dominant list is insignificant with respect to a current threshold, but that there is at least one descendant in the associated tree that is significant with respect to said current threshold value, said lastnames descendant being insignificant with respect to all prior larger threshold values; and
   (d) a Zerotree symbol indicating that a coefficient on said dominant list is insignificant with respect to a current threshold value, and that al descendants in the associated tree, except those found to be significant with respect to a prior larger threshold value, are insignificant with respect to said current threshold value.

7. A system according to claim 6, wherein
   said digital data represents an image composed of picture elements; and
   each said coefficient represents the magnitude of a group of picture elements.

8. A system according to claim 6, wherein
   said digital data represents an image decomposed into plural image representative subbands at each of plural decomposition levels.

* * * * *